United States Patent [19]
Richardson et al.

[11] Patent Number: 5,809,247
[45] Date of Patent: Sep. 15, 1998

[54] METHOD AND APPARATUS FOR GUIDED TOURING OF INTERNET/INTRANET WEBSITES

[75] Inventors: John A. Richardson, Beaverton; Peter J. Kaufman, Banks; Brian Maso, Portland; Carl A. Johnson, Tigard; Rick H. Yeomans, III, Beaverton, all of Oreg.

[73] Assignee: Intel Corporation, Santa Clara, Calif.

[21] Appl. No.: 685,952

[22] Filed: Jul. 22, 1996

[51] Int. Cl.⁶ .................................................. G06F 19/00
[52] U.S. Cl. .............................. 395/200.48; 395/200.59; 395/200.32
[58] Field of Search ................... 395/200.32, 200.48, 395/200.49, 200.33, 200.57, 200.58, 200.59; 707/513

[56] References Cited

U.S. PATENT DOCUMENTS

| | | | |
|---|---|---|---|
| 5,471,675 | 11/1995 | Zias | 395/162 |
| 5,544,315 | 8/1996 | Lehfeldt et al. | 395/200.2 |
| 5,544,320 | 8/1996 | Konrad | 395/200.09 |
| 5,548,726 | 8/1996 | Pettus | 395/200.09 |
| 5,572,643 | 11/1996 | Judson | 395/793 |
| 5,574,915 | 11/1996 | Lemon et al. | 395/700 |
| 5,625,781 | 4/1997 | Cline et al. | 395/335 |

OTHER PUBLICATIONS

Contigo:Itinerary Web Presenter 2.0 FAQ and Data Sheet, Jan. 1997.
Brown, "Special Edition, Using Netscape 2", Dec. 1995.

*Primary Examiner*—Frank J. Asta
*Assistant Examiner*—Matt Kaminer
*Attorney, Agent, or Firm*—Blakely, Sokoloff, Taylor & Zafman

[57] ABSTRACT

The present invention for guided touring of websites includes a web tour director programmed onto a web server for connecting a client system to a number of web sites in accordance with a web tour stop vector identifying the web sites as tour stops of a web guided tour. The present invention further includes a media rendering function also programmed onto the web server for rendering on the client system, one or more corresponding media for each of the web sites, for at least a portion of the time while the web site is connected to the client system.

31 Claims, 25 Drawing Sheets

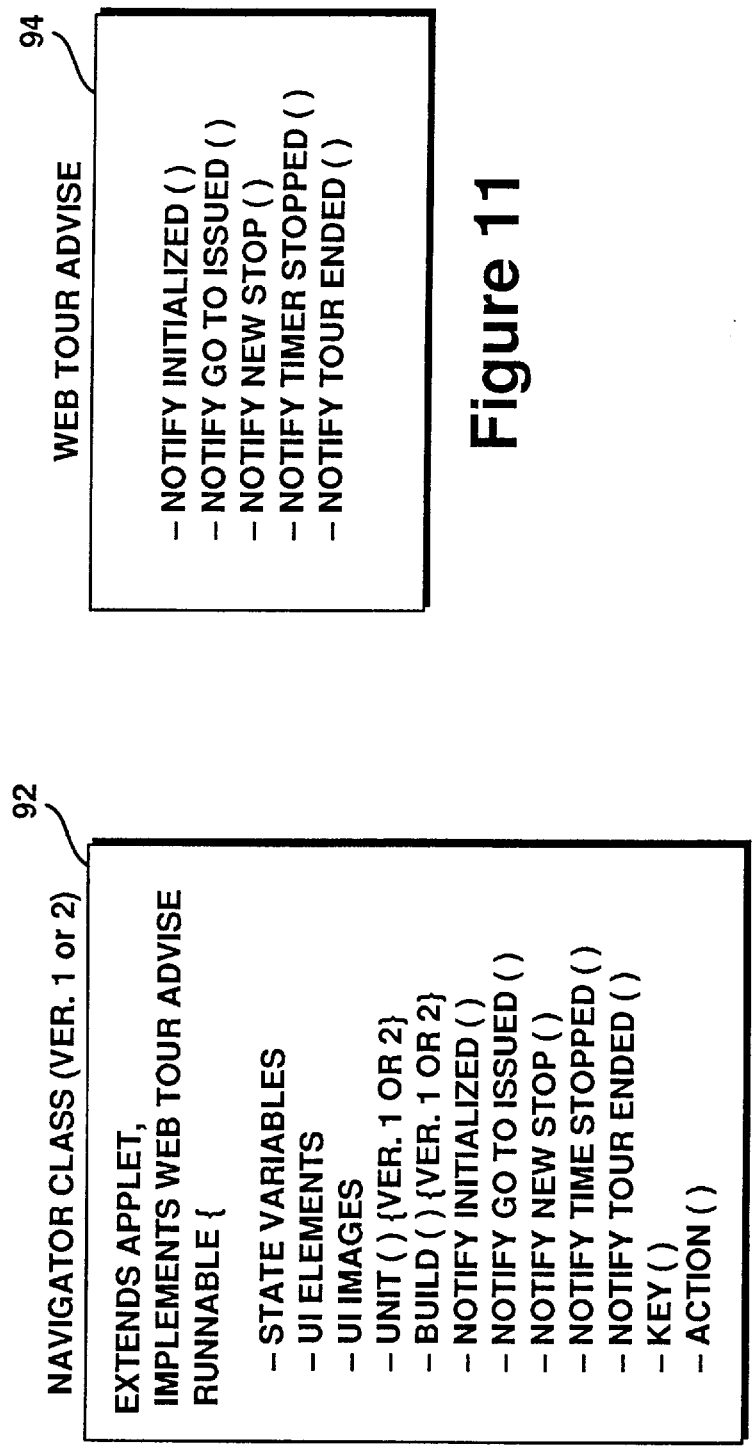

WEB TOUR CONFIGURATION CLASS — 98

- CLASS VARIABLES
- BUILD WEB TOUR VECTOR ( )

Figure 13

WEB TOUR DIRECTOR CLASS — 96

IMPLEMENTS

RUNNABLE {

- CLASS VARIABLES
- FORWARD TOUR ( )
- BACKUP TOUR ( )
- FORWARD TOUR TO SEL'D STOP ( )
- RELOAD CURRENT STOP ( )
- TIMER ( )

Figure 12

METHOD AND APPARATUS FOR GUIDED TOURING OF INTERNET/INTRANET WEBSITES

BACKGROUND OF THE INVENTION

1. Field of the Invention

The present invention relates to the field of Internet/Intranet. More specifically, the present invention relates to the methodologies and tools for a user to locate and view information on the Internet or any Intranet.

2. Background Information

Under the prior art, to locate and view information on the Internet or an Intranet (hereinafter simply "net"), a user would instruct a web browser to connect his/her computer system to a search site, e.g. Yahoo or Alta Vista in the case of the Internet. Through the web browser, the user would then provide certain keywords to the search site, and initiate the search, with or without limiting the search context, e.g. to certain subject category, depending on the nature of the search, what the user knows about the information being sought, such as their availability and where they might be found, and the capabilities of the connected search site. Depending on the purpose of the search, the user might start connecting to the web sites identified in the return set, and viewing their web pages, sequentially or randomly. In other situations, depending on the size of the return set, the user might modify the keywords, expanding or narrowing the search scope. The process would be repeated until a set of manageable size is returned. At such time, the user would start connecting to the web sites identified, and view their web pages. The whole process is repeated if another user wants to do the same search or if the user wants to re-do the same search again at a later time.

In any case, the prior art process is tedious and inefficient. The prior art process would get even more tedious and inefficient as the number websites and web pages available on the net continue to increase astronomically. Thus, it would be desirable to have a more efficient approach to locate and view information available on the net.

Occasionally, for certain subject matters, the prior art process is streamlined by web page owners having common interest and made similar searches before, providing links to related web sites. For example, web pages maintained by certain university department might provide links to other web pages maintained by their counterparts in other universities or related departments in the same or other universities. However, even under this streamlined scenario, the prior art process still has the disadvantage of requiring the user to make the connections to the identified web sites.

Moreover, the user's experience in viewing the web pages in these identified web sites is limited to the contents and the presentations provided by the identified web sites. The web page owner providing the links to the identified web sites is limited in his/her ability to add or complement the contents and presentations provided by the identified web sites, unless the web page owner starts collaborating with the owners of the identified web sites. Otherwise, the web page owner providing the links is typically limited to providing textual comments next to the links. Thus, it would be further desirable to provide a methodology and apparatus for a user to have a more enriching experience in visiting a collection of linked web pages, including methodology and apparatus for the link providing web page owners to add and complement the contents and presentations provided by the identified web sites.

The present invention for guided touring of internet/intranet web sites achieves these as well as other desirable results, which will be readily apparent to those skilled in the art from the detailed descriptions to follow.

SUMMARY OF THE INVENTION

The present invention for guided touring of websites includes a web tour director programmed onto a web server for connecting a client system to one or more web sites in accordance with a web tour stop vector identifying the one or more web sites as tour stop(s) of a web guided tour. The present invention further includes a media rendering function also programmed onto the web server for rendering on the client system, one or more corresponding media for each of the one or more web sites, for at least a portion of the time while a web site is connected to the client system.

Additionally, for one embodiment, the present invention further includes a navigator also programmed onto the web server for facilitating dynamic user modification by a user of the client system to the connection of the client system to the one or more web sites, such as temporarily stopping and resuming the connection, and/or shortening a particular connection, and skipping forward or backward, to the immediate following or preceding one, or any particular unvisited or visited one of the one or more web sites. The media rendering function and the web tour director cooperate with each other to ensure the media are rendered in concert with the connections being made; and the media rendering function is implemented as an integral part of the navigator.

Furthermore, for this embodiment, the present invention further includes a web tour configurator also programmed onto the web server for generating the web tour stop vector on the client system. A plurality of web guided tours identifying multiple sets of web sites are also progammed onto the web server. The web tour configurator generates the web tour stop vector on the client system in accordance with a selected one of the web guided tours.

Lastly, for this embodiment, the navigator with integrated media rendering function is provided to the client system in response to the user of the client system selecting a tour. The navigator in turn "creates" the web tour director resulting in the web tour director being provided to the client system. The web tour director in turn "creates" the web tour configurator resulting in the web tour configurator being provided to the client system, which in turn generates the web tour vector on the client system as described. Once generated, the web tour director and the navigator cooperate to perform the connection and corresponding media rendering as described.

BRIEF DESCRIPTION OF DRAWINGS

The present invention will be described by way of embodiments, but not limitations, illustrated in the accompanying drawings in which like references denote similar elements, and in which:

FIGS. 8–15 illustrate one embodiment of the web tour viewer applets in further detail;

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as applets, classes, methods, data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn in a manner that is most helpful in understanding the present invention, however, the order of description should not be construed as to imply that these operations are necessarily order dependent, in particular, the order of presentation.

Figure 1:
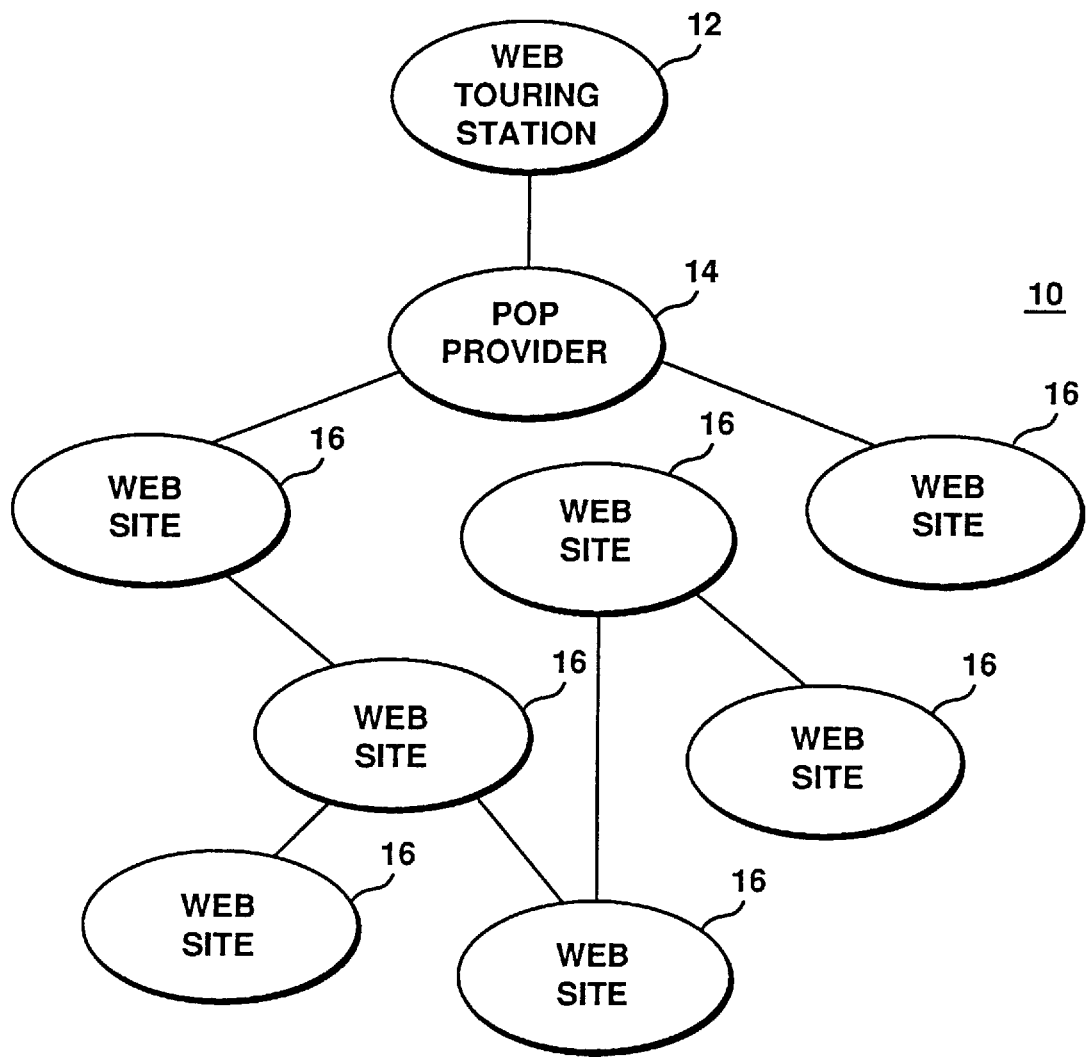
FIG. 1 is a block diagram illustrating an abridged view of the Internet.

Turning now to the details of the present invention, we refer first to FIG. 1, wherein a block diagram illustrating an abridged view of the Internet is shown. As illustrated, client web touring station 12 is coupled to the various websites 16 of the Internet 10 through point-of-presence (POP) provider 14. One or more of websites 16 are incorporated with the teachings of the present invention. Client web touring station 12 is intended to represent a broad category of computer systems equipped with the proper hardware and software for accessing websites 16 on the Internet 10. A particular example of client web touring station 12 is a desktop computer equipped with a Pentium® class processor, memory, a modem, a monitor, a keyboard, a pointing device, system software including support for TCP/IP communication, and a browser. (Pentium is a registered trademark of Intel Corp. of Santa Clara, Calif., assignee of the present invention.) POP provider 14 is intended to represent any number of commercially available POP service provider. Typically, POP provider 14 is located in the same geographical region as web touring station 12. Websites 16 are intended to represent all websites accessible through the Internet at the present time, and in the future. One or more of websites 16 is incorporated with the teachings of the present invention, to be more fully described below.

As will be appreciated by those skilled in the art, Internet 10 includes many more web touring station 12, POP provider 14 and websites 16. The number of these elements illustrated in FIG. 1 are artificially reduced for ease of illustration, and it is not intended to be a limitation to the present invention. Furthermore, while the present invention will be described in the context illustrated by FIG. 1, as will be appreciated by those skilled in the art, the present invention may also be practiced in the context of an intranet, just like a whole host of other internet technologies. Thus, FIG. 1 should not be construed as a limitation of the present invention either.

Figure 2:
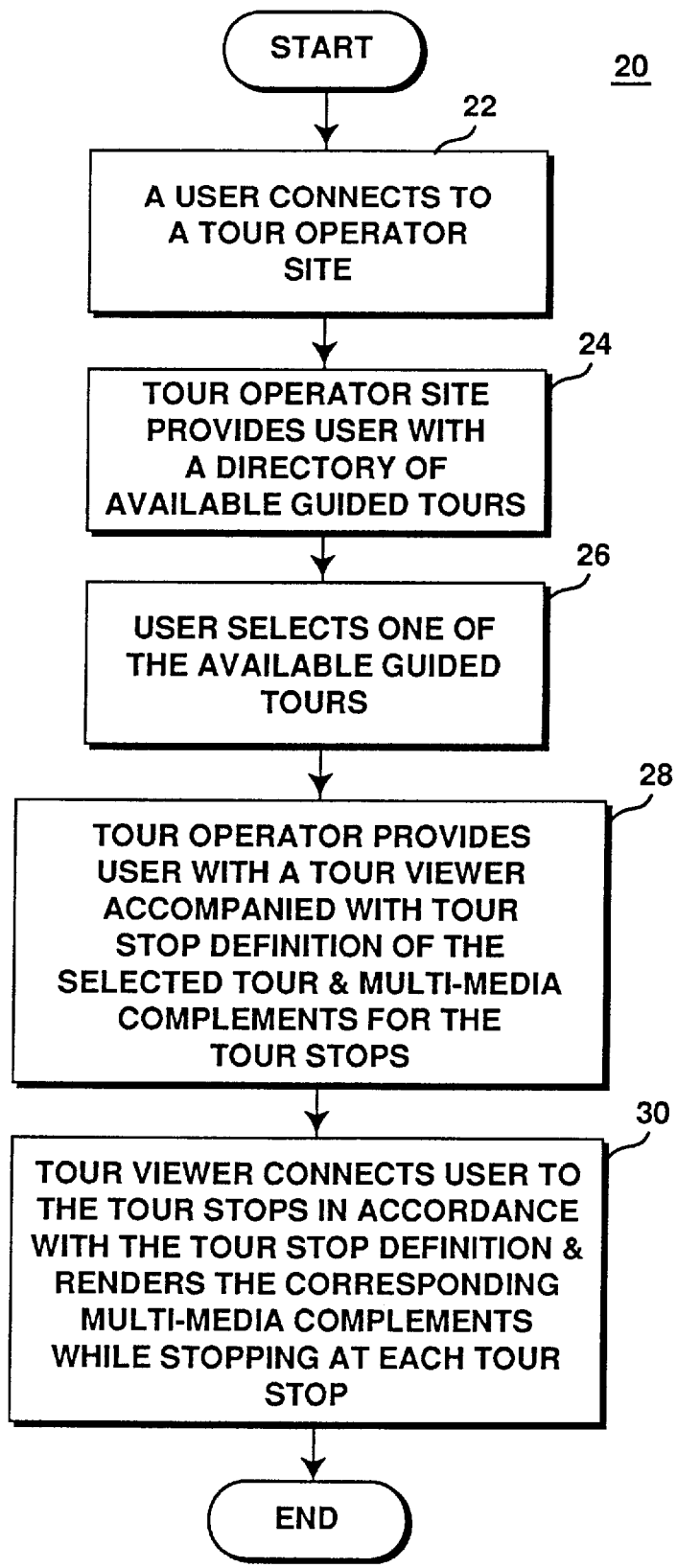
FIG. 2 is a flow diagram illustrating the method steps of the present invention for guided touring of internet/intranet websites.

FIG. 2 illustrates one embodiment of the method steps of the present invention for providing guided touring of websites 16 to a user of web touring station 12. As will be readily apparent from the descriptions to follow, the websites 16 includable in a tour include websites 16 incorporated with the teachings of the present invention, as well as websites 16 not incorporated with the teachings of the present invention. In other words, the website constitution of a tour is independent of the present invention. While it is desirable to have many websites 16 incorporated with the teachings of the present invention, only one website 16 incorporated with the teachings of the present invention is necessary for guided tours to be provided in accordance with the present invention.

As shown, for the illustrated embodiment, guided touring of websites 16 in accordance with the present invention starts with the user of web touring station 12 connecting web touring station 12 to a tour operator website, preferably (but not necessarily) a website 16 incorporated with the teachings of the present invention, step 22. In response, tour operator website provides user with a directory of available guided tours, step 24. User then selects one of the available guided tours, step 26. In response, tour operator provides user with a web tour viewer of the present invention accompanied with a definition of the tour stops (i.e. websites) for the selected tour, and corresponding media complements for the tour stops, step 28. Web tour viewer then connects web touring station 12 to the tour stops in accordance with the tour stop definition, and renders the corresponding media complements at each of the tour stops, step 30.

Steps 24 and 26 are optional. It is expected that the present invention may be practiced by tour operators, each providing only a single guided tour. For these tour operators, they may go straight to step 28. Rendering of media complements at tour stops is also optional. However, as will be appreciated by those skilled in the art, rendering of media complements at tour stops is highly desirable, as it significantly enriches the touring experience of the user taking the tour. Preferably, the media complements should be multi-media, e.g. including audio as well as video and/or animation. Stopping at multiple tour stops is also optional. The present invention may be practiced by tour operators providing single-stop tours, however, it is anticipated that the tour operator will be providing significant multi-media complement to the information available from the single tour stop.

Figure 3:
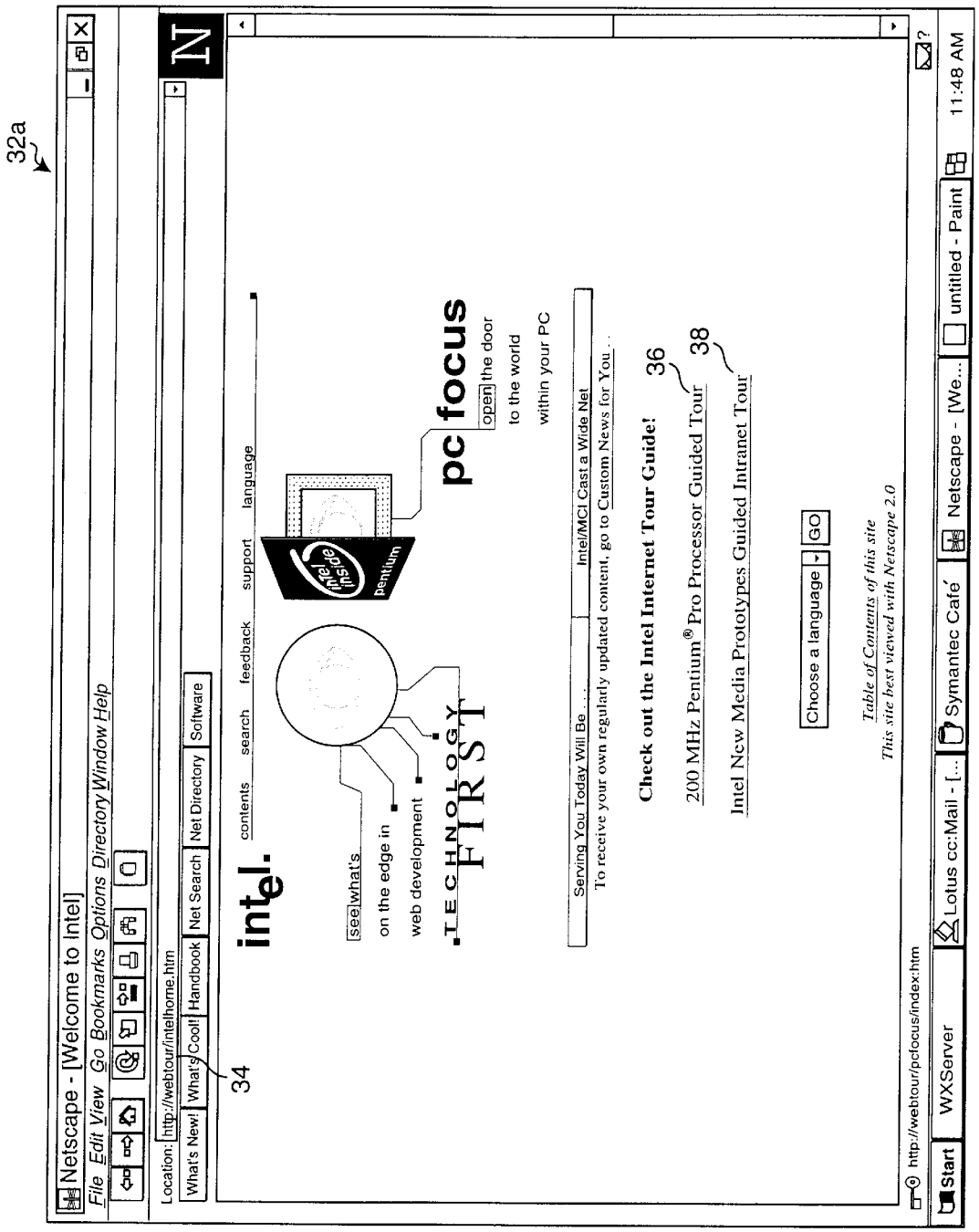
FIGS. 3–5 are end user screens of a sample guided tour provided in accordance with the present invention.
Figure 4:
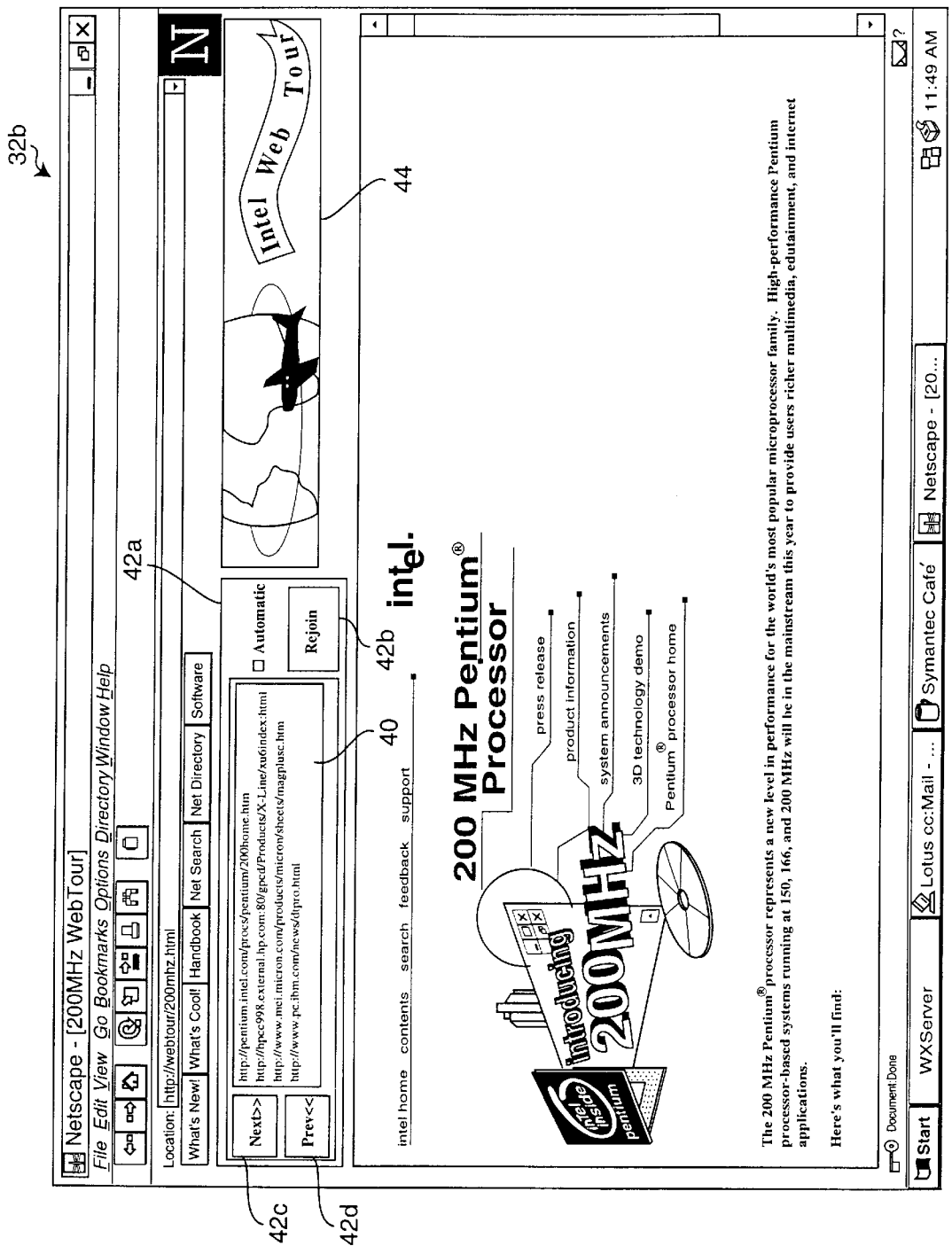
Figure 5:
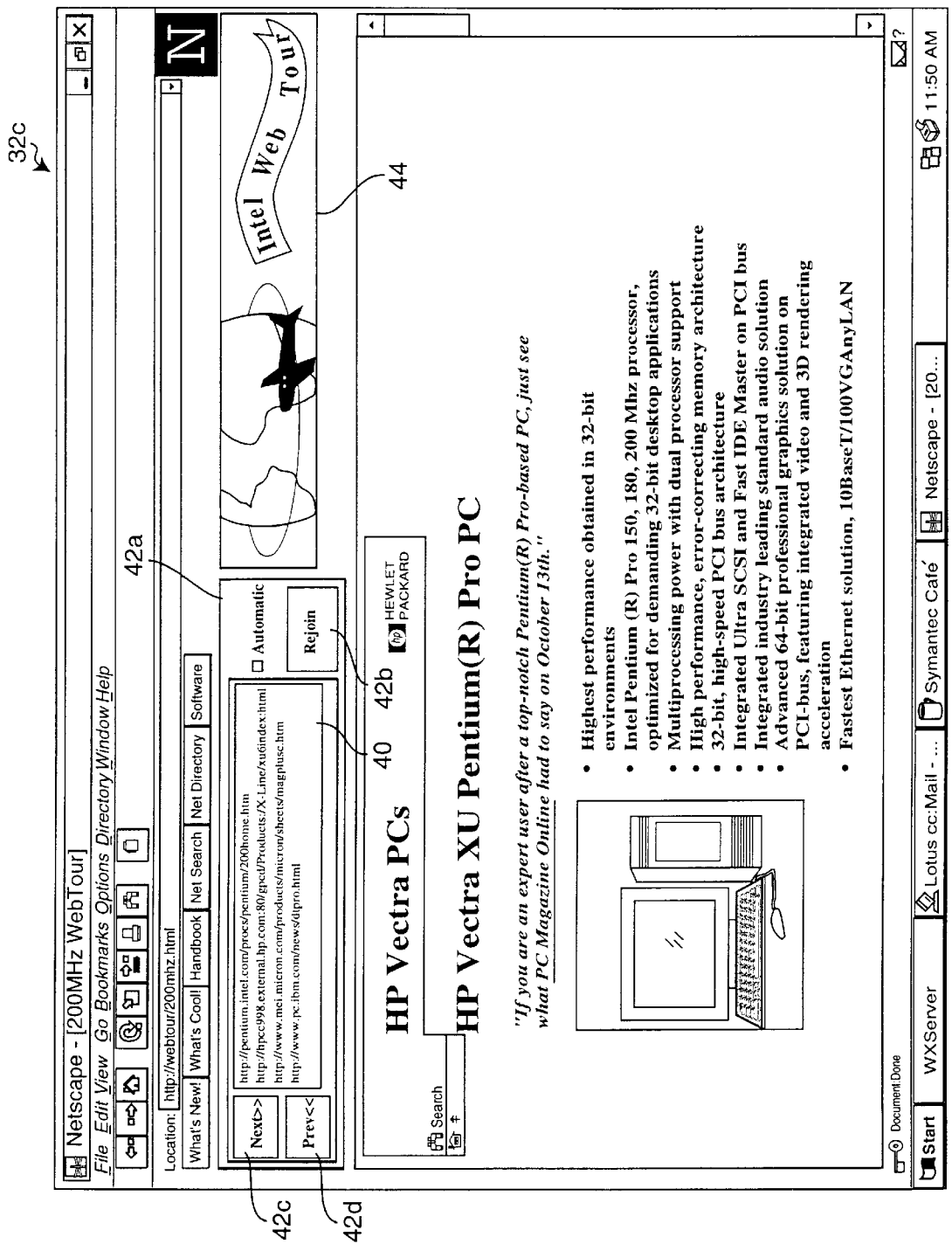

FIGS. 3–5 illustrates a portion of a sample guided tour taken in accordance with the present invention. Illustrated in these figures are end user screens 32a–32c displayed on a monitor at web touring station 12 of the user taking the tour. As shown, web touring station 12 is equipped with a browser developed by Netscape Communication of Mountain View, Calif. In this example, the tour operator is an "internal" operator located at a website on an intranet with the address "webtour" 34, and the tour operator offers two guided tours 36 and 38. The first tour, i.e. "200 MHz Pentium® Processor Pro Processor Guided Tour" includes four tour stops, "pentium.intel.com", "hpcc998.external.hp.com", "www.mei.micron.com", and "www.pc.ibm.com" 40. Note that all four tour stops are websites on the Internet 10, and with the exception of "pentium.intel.com", these websites are all owned and maintained by companies other than the tour operator, i.e. Micron Technology of Boise, Id., Helweft Packard of Palo Alto, Calif., and IBM of Armonk, N.Y. As will be apparent from the descriptions to follow, only website "webtour" 34 necessarily incorporated the teachings of the present invention.

As described earlier, end user screen 32a is provided by the tour operator when the user connects his/her web touring station 12 to the tour operator website. Web tour viewer of the present invention is provided to the user, more specifically, his/her web touring station 12, when the user selects the "200 MHz Pentium® Pro Processor Guided Tour" 36. Web tour viewer then connects web touring station 12 to the first tour stop "pentium.intel.com". End user screen 32b is a web page provided by website "pentium.intel.com". While stopping at the website "pentium.intel.com", web tour viewer of the present invention renders an audio complement, complementing the information provided by the web pages. As will be described in more details below, the media complements are provided by and located at the tour operator's website, in this case, "webtour".

Upon stopping at website "pentium.intel.com" for a predetermined duration, web tour viewer of the present invention automatically connects the user's web touring station 12 to the second tour stop, i.e. website "hpcc98.external.hp.com". Similarly, end user screen 32c is a web page provided by website "hpcc98.external.hp.com". While stopping at the website "hpcc98.external.hp.com", web tour viewer of the present invention renders another audio complement, complementing the information provided by the web pages.

As described earlier, web tour viewer of the present invention continues this process, connecting the user's web touring station 12 to the defined tour stops, one tour stop at a time, and rendering media complements at each of the tour stops, until all tour stops have been visited.

In this sample touring application of the present invention, web tour viewer of the present invention also provides the user with a plurality of control buttons 42a–42d to allow the user to dynamically modify how the tour is taken, if the user so desire. These control buttons 42a–42d include "automatic" button 42a for instructing the web touring viewer of the present invention to stop taking the user to the various tour stops, and "rejoin" button 42b to rejoin the guided tour. Control buttons 42a–42d also include "next>>" and "prev<<" buttons 42c–42d for instructing the web touring viewer of the present invention to end the current stop, and move the tour forward and backward one stop respectively. By enumerating the tour stops 40, this sample application also allows the user to instruct the web tour viewer of the present invention to skip to any one of the defined tour stops. Lastly, this sample application also allows a logo or advertisements 44 to be displayed as the tour progresses from tour stop to tour stop.

Having now described an overview of guided touring of websites in accordance with the present invention, we will now described one implementation of web tour viewer of the present invention, with references to the remaining figures.

Figure 6:
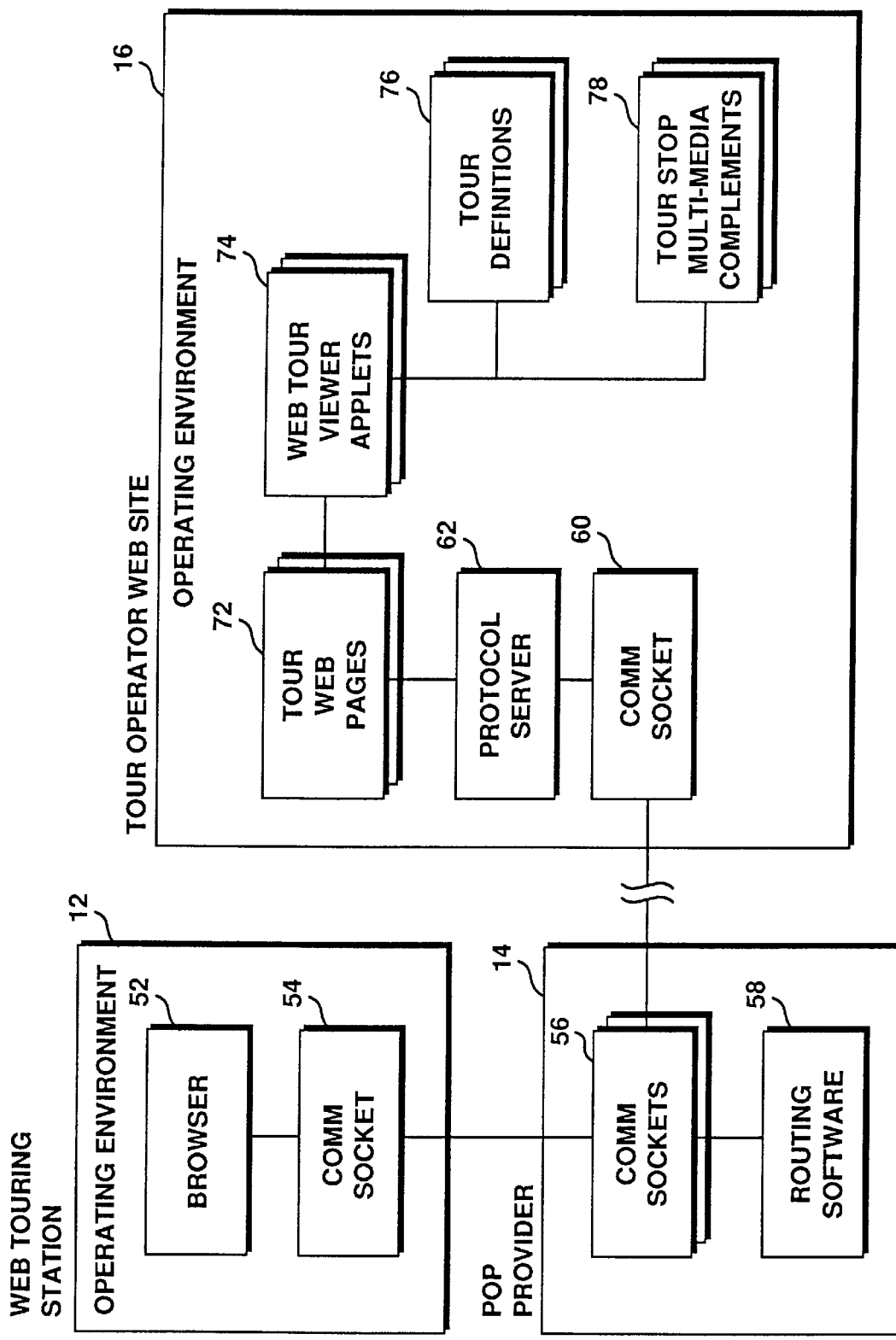
FIG. 6 illustrates one embodiment each of a web tour station and a tour operator website in further detail.

Referring first to FIG. 6, wherein one embodiment each of a web touring station 12, a POP provider 14 and a tour operator website 16 incorporated with the teachings of the present invention are illustrated in further detail. As shown, for the illustrated embodiment, web touring station 12 is equipped with browser 52. Browser 52 includes an embedded virtual machine (not shown) for executing applets, and the embedded virtual machine includes an interface for the local operating environment (system software) to notify the embedded virtual machine of various events of interest to the applets being executed by the embedded virtual machine. As decried earlier, a particular example of browser 52 is Nescape Navigator 3.0 having an embedded JAVA virtual machine for executing JAVA applets, developed by Nescape Comm.

Web touring station 12 through its own communication socket 54 and POP provider 14 is communicatively coupled to tour operator website 16. For the illustrated embodiment, POP provider 14 includes a number of communication sockets 56 and routing software 58 for facilitating exchanges of TCP/IP communication packets between web touring station 12 and tour operator web site 16.

For the illustrated embodiment, tour operator website 16 includes communication socket 60 and TCP/IP communication protocol server 62, e.g. a http server. More importantly, tour operator website 16 is programmed with tour pages 72, web tour viewer applets 74, tour definitions 76 and tour stop media complements 78, in accordance with the present invention. Tour pages 72 are used to provide a directory of available guided tours to the user, and to launch the web tour viewer applets 74 with the appropriate tour stop definition 76 and media complements 78, when a particular tour is selected. Web tour viewer applets 74 collectively implement web tour viewer of the present invention, i.e. connecting web touring station 12 to the tour stops of a selected tour, and rendering corresponding media complements when stopping at the tour stops. Tour definitions 76 define the tour stops and their properties for different tours. Tour stop media complements 78 are the corresponding media files, such as audio, video, graphics, and/or animation files that get rendered when stopping at the tour stops.

Figure 7:
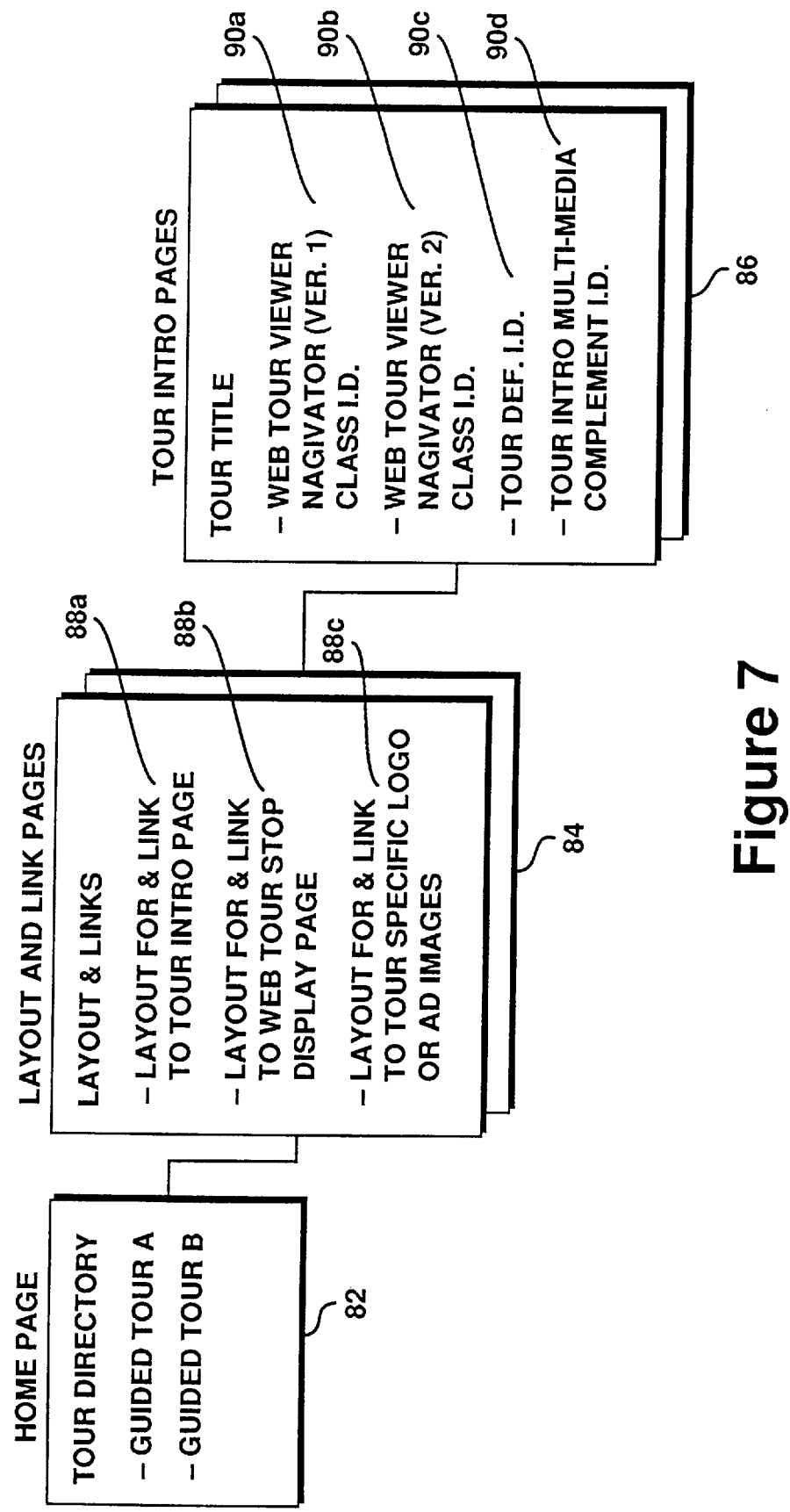
FIG. 7 illustrates the web pages programmed onto the tour operator website in further detail.

FIG. 7 illustrates one embodiment of web pages 72 in further details. As shown, for the illustrated embodiment, web pages 72 include a home page 82, a number of layout and link pages 84 and a number of tour intro pages 86. Home page 82 is used to provide a tour directory of available guided tours to the user of web touring station 12. Home page 82 lists the available guided tours. Home page 82 is provided to web touring station 12 when the user connects his/her web touring station 12 to tour operator website 16.

Layout and link pages 84 are used for defining the screen layout areas and initial links for the available guided tours. For the illustrated embodiment, there is one layout and link page 84 for each available guided tour, and each layout and link page 84 enumerates at least three different screen layout areas and their corresponding initial links. The first enumeration 88a defines a first screen layout area for displaying the tour stops of a selected tour, and for providing a number of control buttons to allow the user to dynamically modify how the tour is taken, if the user so desire. This first screen layout area is initially linked to a tour intro page 86 of the particular guided tour. The second enumeration 88b defines a second screen layout area for displaying the web pages of the tour stops when the tour is conducted. This second screen layout area is initially linked to a blank page (not shown). The third enumeration 88c defines a third screen layout area for displaying graphics, such as a logo for the guided tour, or in the alternative, advertisements. This third screen layout area is initially linked to a logo or an ad page (not shown). In an alternate embodiment, the third screen layout area may also be used animation and/or video. The layout and link page 84 for a guided tour is provided to web touring station 12 when the user selects the guided tour from the list of available guided tours.

Tour intro pages 86 are used to identify the initial applet (s) of web tour view applets 74, and tour definition 76, as well as the introductory media complement 78 for the selected tour, to be provided to web touring station 12. For the illustrated embodiment, which is implemented using the JAVA programming language, each tour intro page 86 includes a first and a second identifier 90*a*–90*b* for identifying two versions of a navigation class, to be described more fully below, a third identifier 90*c* for identifying a tour definition 76, and a fourth definition 90*d* for identifying a tour introduction media complement. The tour intro page 86 for a guided tour is provided to web touring station 12 as a result of web touring station 12 executing link 88*a* in the corresponding layout and link page 84.

Figure 8:
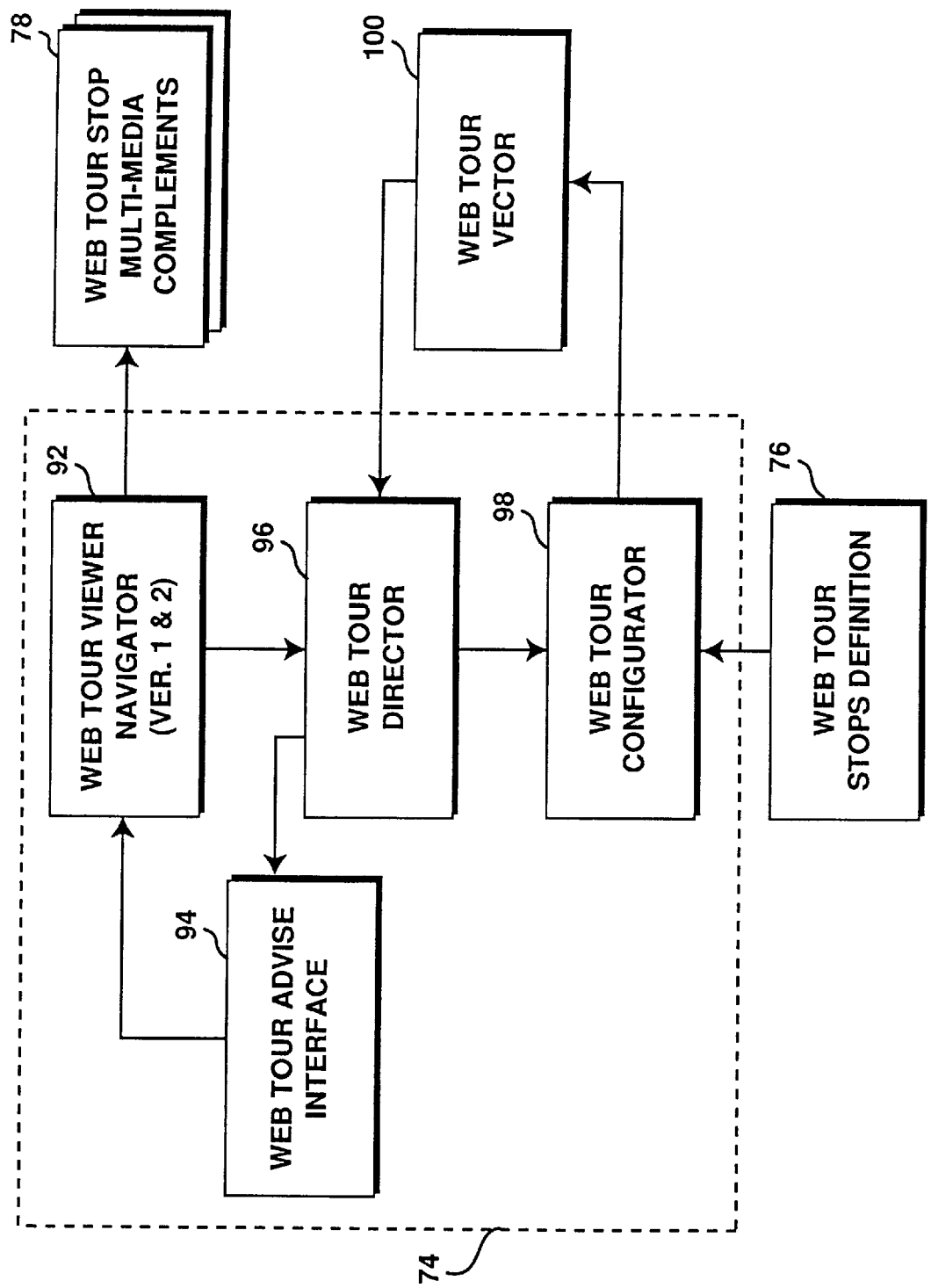

FIGS. 8–15 illustrate one embodiment of web tour viewer applets 74 in further details. As shown in FIG. 8, for the illustrated embodiment, web tour viewer applets 74 include web tour navigation class (or simply navigator) 92, web tour advise interface class (or simply advise interface) 94, web tour director class (or simply director) 96 and web tour configuration class (or simply configurator) 98. Director 96 is used for connecting web touring station 12 to one or more websites 16 defined by tour stop vector 100 as tour stop(s) of a guided tour. Navigator 92 includes a media rendering function for rendering corresponding media complements 78 when stopping at each of the tour stops. Navigator 92 also implements advice interface 94, which is used by director 96 to keep navigator 92 notified of various touring related events, so that navigator 92 may render media complements 78 in concert with the connections being made by director 96.

Navigator 92 is also used for facilitating dynamic user modifications to how the tour is taken, including the building of a graphical end user interface (GUI) having a displayed list of the tour stops and a plurality of control buttons for the user to denote his/her desired modifications to the tour, and responding to the user interactions with the GUI. Navigator 92 responds to the user interactions with the GUI by invoking the appropriate methods of director 96.

To provide enhanced performance, the illustrated embodiment includes two versions of navigator 92. The two versions are identical except for the fact that the first version builds a stripped down version of the GUI and "creates" director 96 after building the stripped down GUI, thereby reducing the latency from the time the user selects a tour to the time the user sees the first web page of the first tour stop, whereas the second version builds the full GUI, which takes significantly longer than the stripped down GUI, and takes over director 96 after the full GUI is built, subsuming the first version.

For the illustrated embodiment, web tour vector 100 is generated by web tour configurator 98 in accordance with a tour stop definition 76 defining the tour stops, their properties and corresponding media complements of a guided tour.

Figure 9:
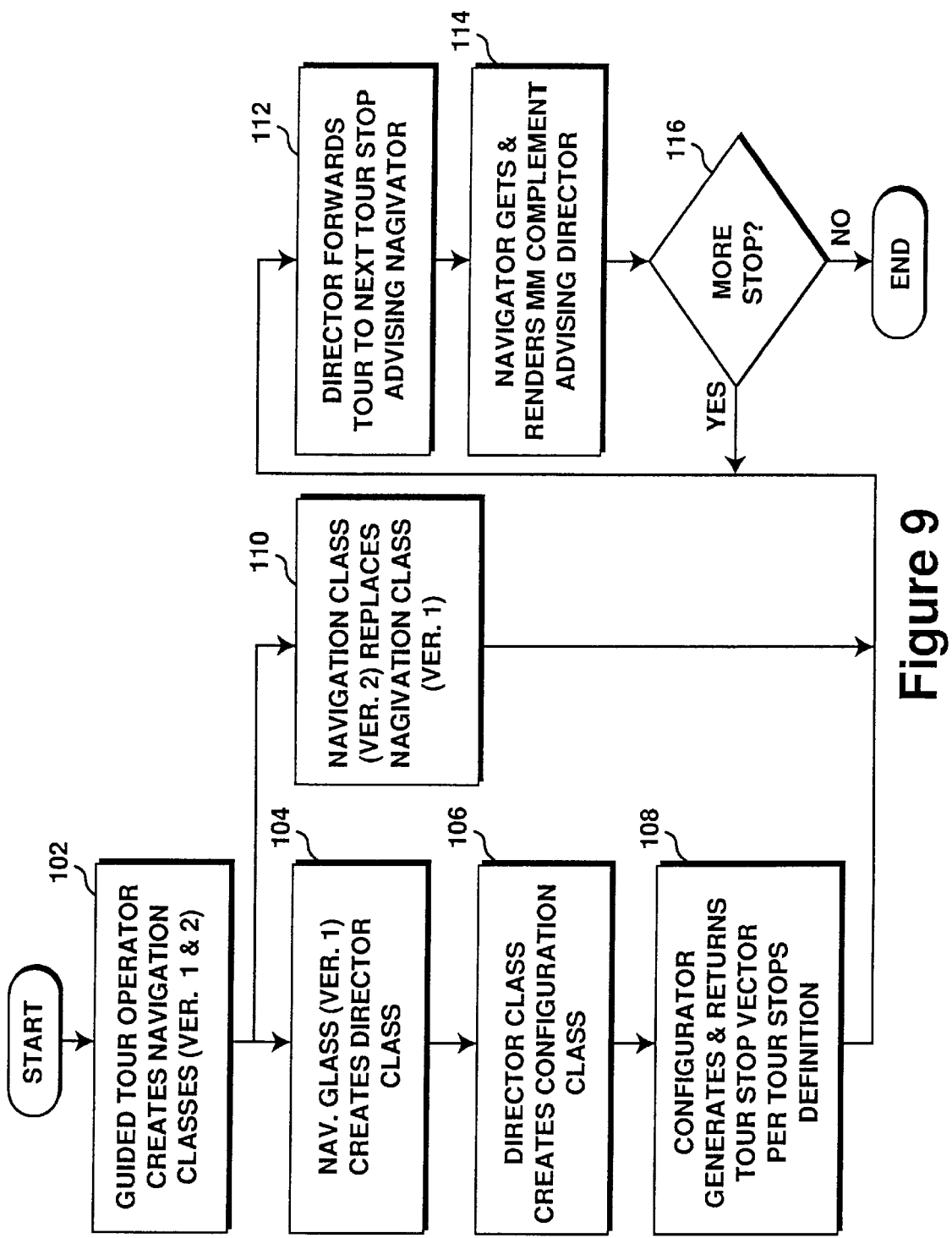

As shown in FIG. 9, for the illustrated embodiment, navigator 92 (both versions) are provided to web touring station 12 as a result of the identification links of tour intro page 86 being executed by the embedded virtual machine of browser 52 on web touring station 12, step 102. In turn, navigator 92 "creates" director 96 on web touring station 12, resulting in director 96 being provided to web touring station 12, step 104. Director 96 then "creates" configurator 98 on web touring station 12, resulting in configurator 98 in conjunction with web tour stop definition 76 being provided to web touring station 12, step 106. Configurator 98 in turn generates web tour vector 100 on web touring station 12, step 108. Once generated, director 96 and navigator 92 cooperate with each other to connect web touring station 12 to the defined tour stops, and render corresponding media complements 78 as described earlier, steps 112–116. In FIG. 9, the second version of navigator 92 is being shown as subsuming the first version after configurator 98 has generated web tour vector 100. The timing is for illustrative purpose only. The second version of navigator 92 may subsume the first version at an earlier time or a later time.

As shown in FIG. 10, for the illustrated embodiment, navigation class 92 extends the applet class and implements web tour advise interface 94 with a number of runnables. The runnables include a number of state variables denoting various control and state information for conducting guided touring in accordance with the present invention, a number of GUI elements and GUI images for building the GUI. The control and state information includes information such as "tour is in progress", and "tour is not in progress". They are readily apparent to those skilled in the art, and will not be further described. Similarly, except for an optimization technique employed in constructing them, GUI elements and GUI images include icon designs and control buttons. They too are readily apparent to those skilled in the art, and will not be further described.

Additionally, the runnables include a number of methods, specifically, an Init() method, and a BuildGUI() method, a NotifyInitialized() method, a NotifyGoToIssued() method, a NotifyNewStop() method, a NotifyTimerStopped() method, a NotifyTourEnded() method, a Key() method, and an Action() method. There are two versions of the Init() as well as the BuildGUI() methods, one for each of the two version of navigation class 92. The Init() methods are used to initialize the two versions of navigation class 92, whereas the BuildGUI() methods are used to build a stripped down and a full GUI for facilitating dynamic user modification to how the tour is conducted. As described earlier, the first version of BuildGUI() builds a stripped down version of the GUI, to allow early creation of director 96, and therefore reducing the latency perceived by the user. The second version of BuildGUI() builds the full GUI. The Notifyxxx() methods are used to handle various event notifications from director 96. The Key() and Action() methods are used to handle user interactions with the GUI.

Figure 31:
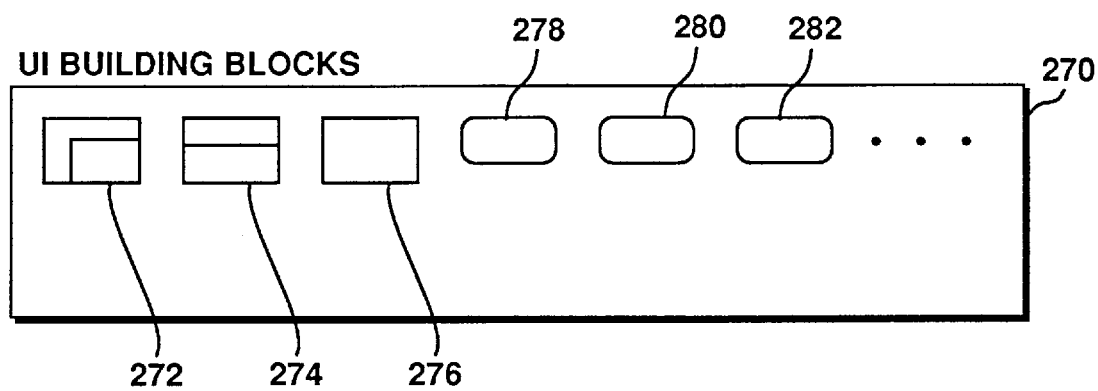
FIG. 31 illustrates one aspect of an optimization technique employed by the navigation class for building GUI images and icons.

As those skilled in the art will appreciate that web browsing can be slow at times if a large number of data packets have to be transferred over the Internet. Thus, for the illustrated embodiment, both versions of the BuildGUI() method employ a performance enhancement optimization technique. Instead of shipping finished images or icons individually from tour operator website 16 to web touring station 12. The base elements necessary to construct all required GUI images and icons are shipped instead. Furthermore, the base elements are combined and transferred as a single file instead. Skipping briefly now to FIG. 31 wherein this inventive technique is illustrated. Shown are a number of GUI building base elements, corner 272, straight line 274 and blank tile 276. Also shown are the different states of a sample control button 278–282, representing an unpressed, a pressed, and a disabled state. These base elements are bundled together and transferred as one file when navigation class 92 is transferred from tour operator website 16 to web touring station 12. The two versions of BuildGUI() method build the various required images and icons for the stripped down version as well as the full feature version using these base elements, by "piecing" them together, duplicating and/or transforming them as necessary. Except for the performance enhanced approach for making GUI images and icons available on web touring station 12, the building of GUI is otherwise well within the ability of those skilled in the art. Accordingly, neither versions of the BuildGUI() method will be further described. Both versions of the Init() method, as well as all the other methods will be described in further details below.

As shown in FIG. 11, web tour advise interface 94 provides a number of notification methods for director 96 to advise navigator 92 of various touring events. The notification methods include a NotifyInitialized(), a NotifyGoToIssued(), a NotifyNewStop() method, a NotifyTimerStopped() method, and a NotifyTourEnded() method. The actual implementation of these methods are in navigation class 92. As will be appreciated by those skilled in the art, the definition of these notification methods in a separate interface class is merely a JAVA programming technique, thus should not be read as a limitation of the present invention.

As shown in FIG. 12, for the illustrated embodiment, director class 96 implements a number of runnables, including a number of local class variables, in particular, a timer variable, and a number of methods. These methods include a ForwardTour() method, a BackupTour() method, a ForwardTourToSelStop() method, a ReloadCurrentStop() method, and a Timer() method. The ForwardTour() method is used to forward a guided tour by one stop, whereas the BackupTour() method is used to back up a guided tour by one stop. The ForwardTourToSelStop() is used to forward a guided tour to a specific stop selected by the user, whereas the ReloadCurrentStop() is used to reset the tour to the current stop. Finally the Timer() method is used to perform a number of timer related functions. These methods will be described in further details below.

As shown in FIG. 13, for the illustrated embodiment, web tour configuration class 98 includes a number of local class variables, and a BuildWebTourVector() method. BuildWebTourVector() method is used to generate web tour vector 100 based on a tour stop definition 76.

Figure 15:
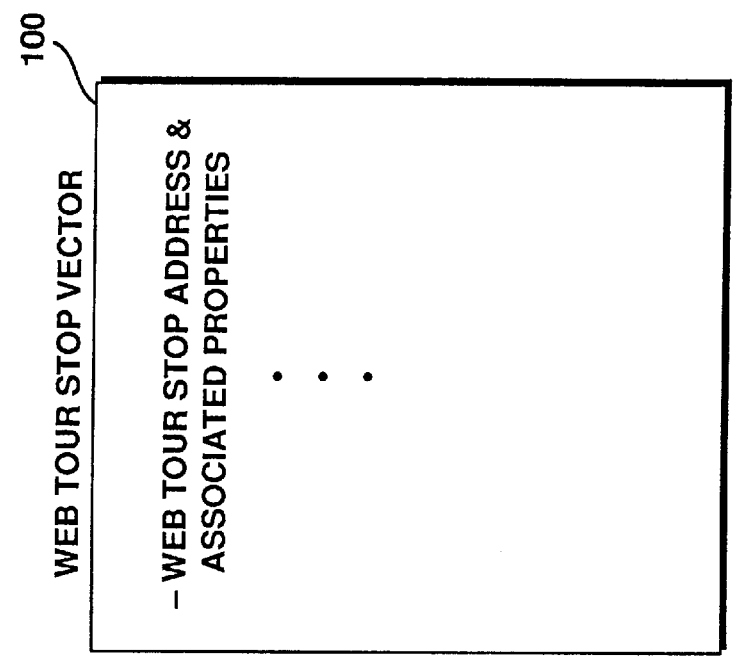
Figure 14:
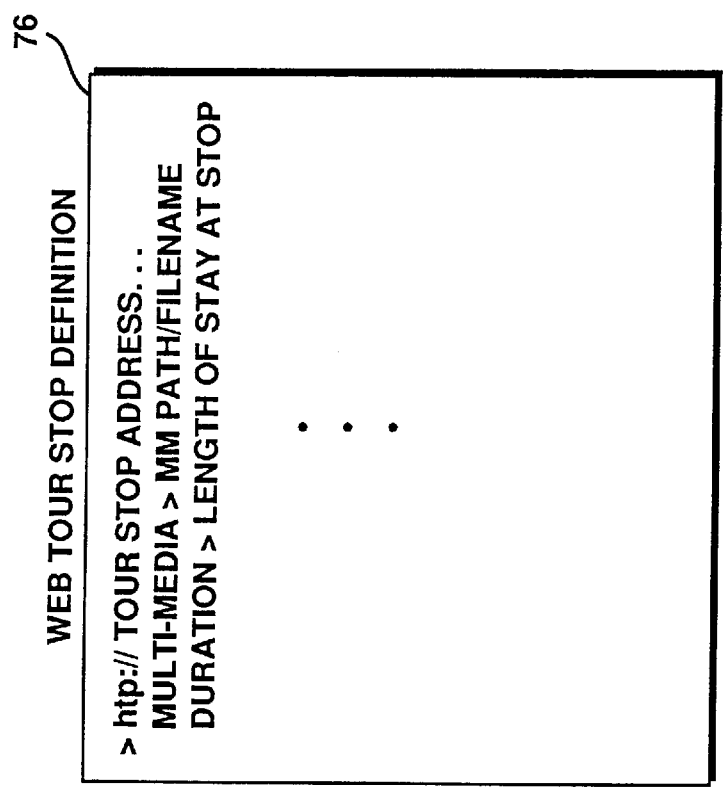

As shown in FIG. 14, for the illustrated embodiment, tour stop definition 76 includes a number of tour stop descriptor entries. Each tour stop descriptor entry includes the tour stop's domain address, its associated media complements, and the durations of the stay at the stop and/or the durations of the associated media complements. Each tour stop descriptor entry may also include interrelationships between all or a subset of the media complements. For example, information denoting a first audio stream is to be rendered as "background", with a second audio stream to be rendered overlaying the first audio stream. As shown in FIG. 15, for the illustrated embodiment, web tour vector 100 includes a number of indexed tour stop objects. Each tour stop object includes the information provided by the corresponding description entry in tour stop definition 76. In other words, definition 76 is textual description of the tour stops, whereas vector 100 is "executable" description of the tour stops.

Figure 17:
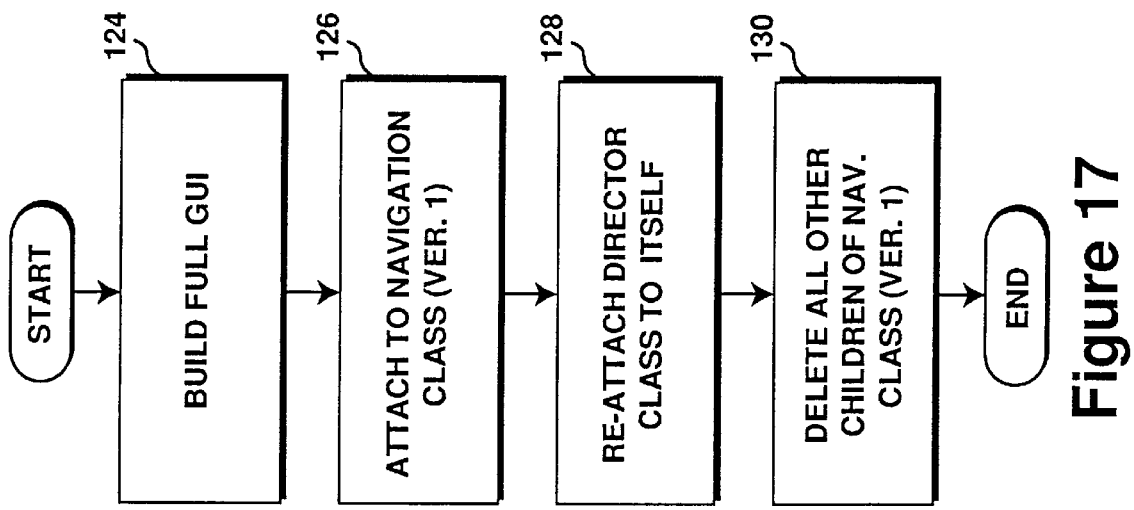
FIGS. 16–23 illustrate one embodiment each of the methods of navigation class in further details.
Figure 16:
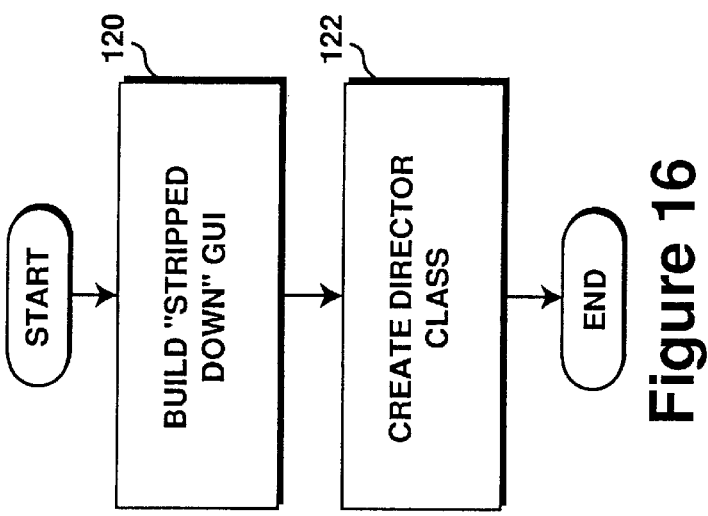

FIGS. 16–23 illustrated one embodiment each for the various methods of navigation class 92. As shown in FIG. 16, upon given control, that is at initialization time, the first version of the init() method builds the "stripped down" version of GUI, step 120. Then, init() method "creates" director class 96, resulting in its applet being provided to web touring station 12 from tour operator website 16, step 122. As shown in FIG. 17, upon given control, that is at initialization time, the second version of the init() method builds the full GUI, step 124. The second version of the init() method initially builds the full GUI with a single pixel screen layout area. Thus, the background building of the full GUI is not visible to the user, until the full GUI is built and replaces the stripped down GUI. Upon completion, the init() method attaches the second version of navigation class 92 to the first version (as its child class), step 126. Next, the init() method re-attaches director class 96 to itself as its child class (as oppose to the first version's child class), step 128. Finally, the init() method deletes all other child class of the first version, and subsumes the first version, step 130.

Figure 18:
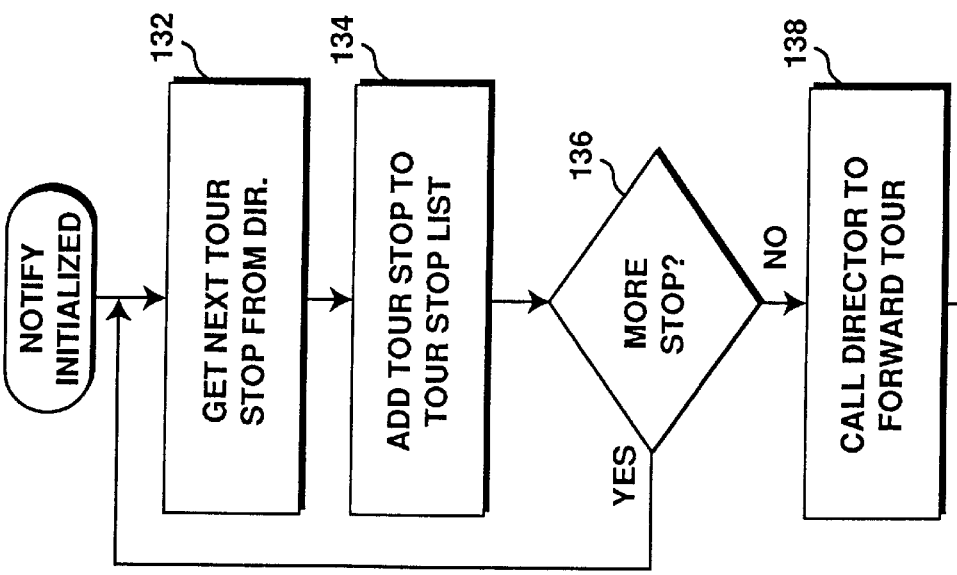

As shown in FIG. 18, upon given control, that is when navigation class 92 is notified of the fact that director class 96 has completed initialization, the NotifyInitialized() method gets the next tour stop from director class 96, step 132. The NotifyInitialized() method then adds the tour stop to a tour stop list and refreshes the displayed list, step 134. The NotifyInitialized() method repeats steps 132–134 until all tour stops of the tour have been obtained from director class 96. Upon obtaining all the tour stops, the NotifyInitialized() method calls the ForwardTour() method of director calls 96 to forward the tour to the next stop, step 138.

Figure 19:
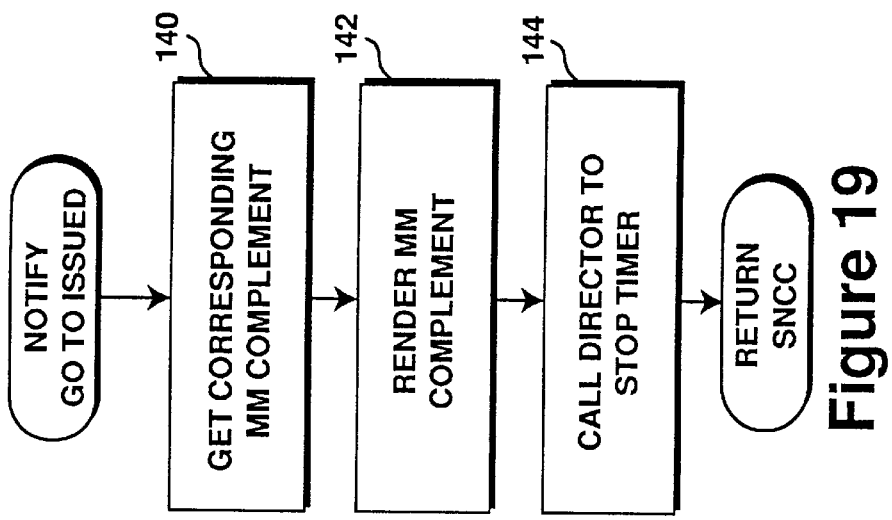

As shown in FIG. 19, upon given control, that is when navigation class 92 is notified of the fact that director class 96 has issued a GoTo command to connect web touring station 12 to the next tour stop, the NotifyGoToIssued() method gets the corresponding media complement for the next tour stop from tour operator website, step 140. Upon obtaining the media complement, the NotifyGoToIssued() method renders the media complement, step 142. For the illustrated embodiment, the NotifyGoToIssued() method cross checks the identity of the connected website before rendering the obtained media complement. In other words, for the illustrated embodiment, a media rendering function is built in as an integral part of navigation class 92. Upon rendering the media complement, the NotifyGoToIssued() method calls the Timer() method of director class 96 to stop the timer of director class 96, which is used to track the duration of stay at each stop as well as the durations of the various media complements, step 144.

Figure 20:
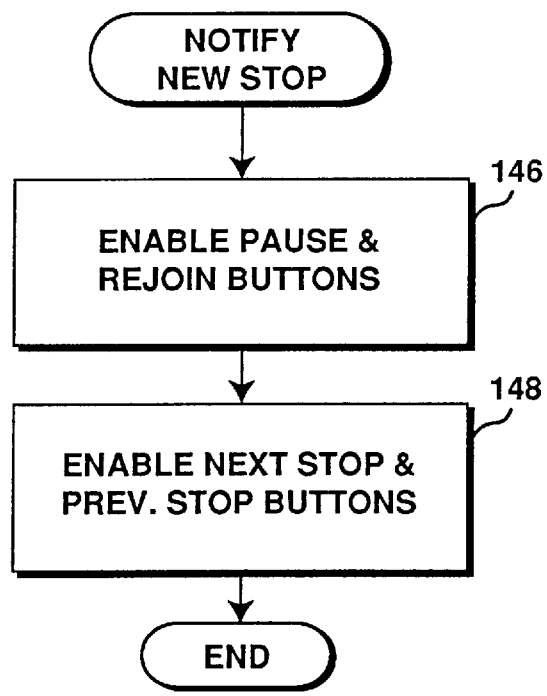

As shown in FIG. 20, upon given control, that is when navigation class 92 is notified of the fact that the tour has reached a new stop, for the illustrated embodiment, the NotifyNewStop() method enables a "pause" and a "rejoin" control button of the GUI, step 146. Next, the NotifyNewStop() method also enables a "nextstop" and a "prevstop" control button of the GUI, step 148. (These control buttons are similar to those provided in the GUI of the sample application illustrated by FIGS. 3–5.)

Figure 21:
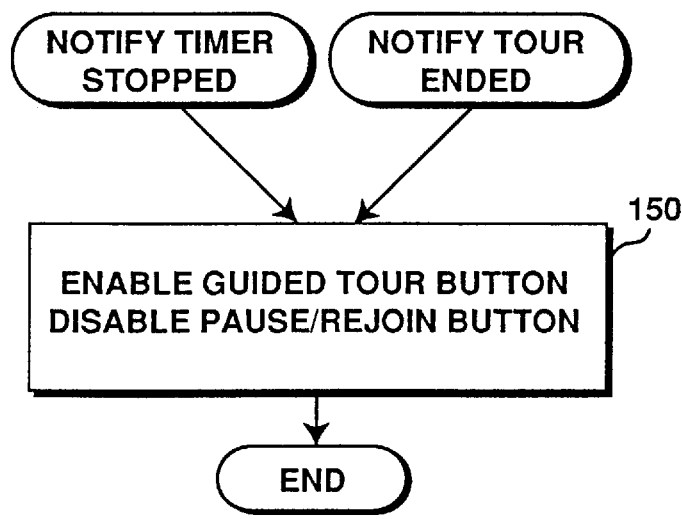

As shown in FIG. 21, upon given control, that is when navigation class 92 is either notified of the fact that the timer of director class 96 has stopped or notified of the fact that the tour has ended, for the illustrated embodiment, the NotifyTimerStopped() or NotifyTourEnded method enables a "GuidedTour" control button, and disables the "pause" and "rejoin" control buttons of the GUI, step 150. (The "GuidedTour" control button is similar to the "automatic" button of the sample application illustrated by FIGS. 3–5.)

Figure 22:
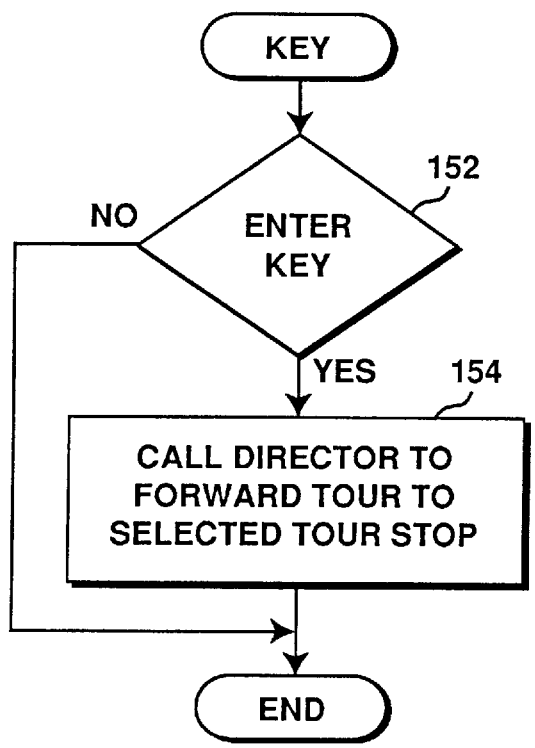

As shown in FIG. 22, upon given control, that is when navigation class 92 is notified of the fact that the user has depressed a key, for the illustrated embodiment, the Key() method determines if the depressed key is the "enter" key, step 152. If the determination is positive, the Key() method calls the ForwardTourToSelStop() method of director class 96 to forward the tour to the selected one of the displayed tour stops in the GUI, step 154.

Figure 23:
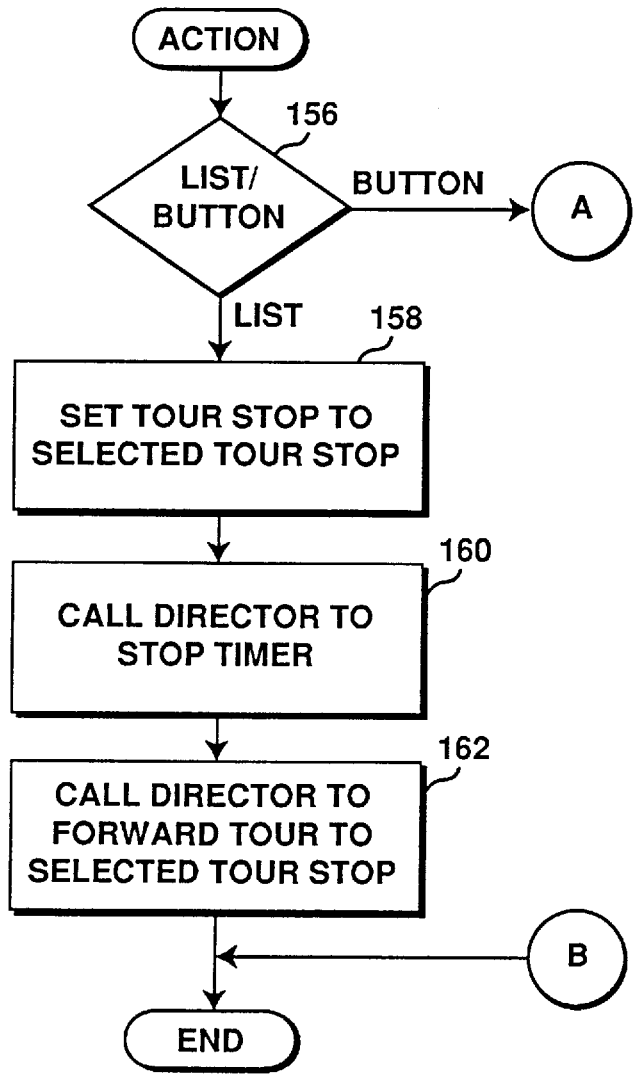
Figure 23:
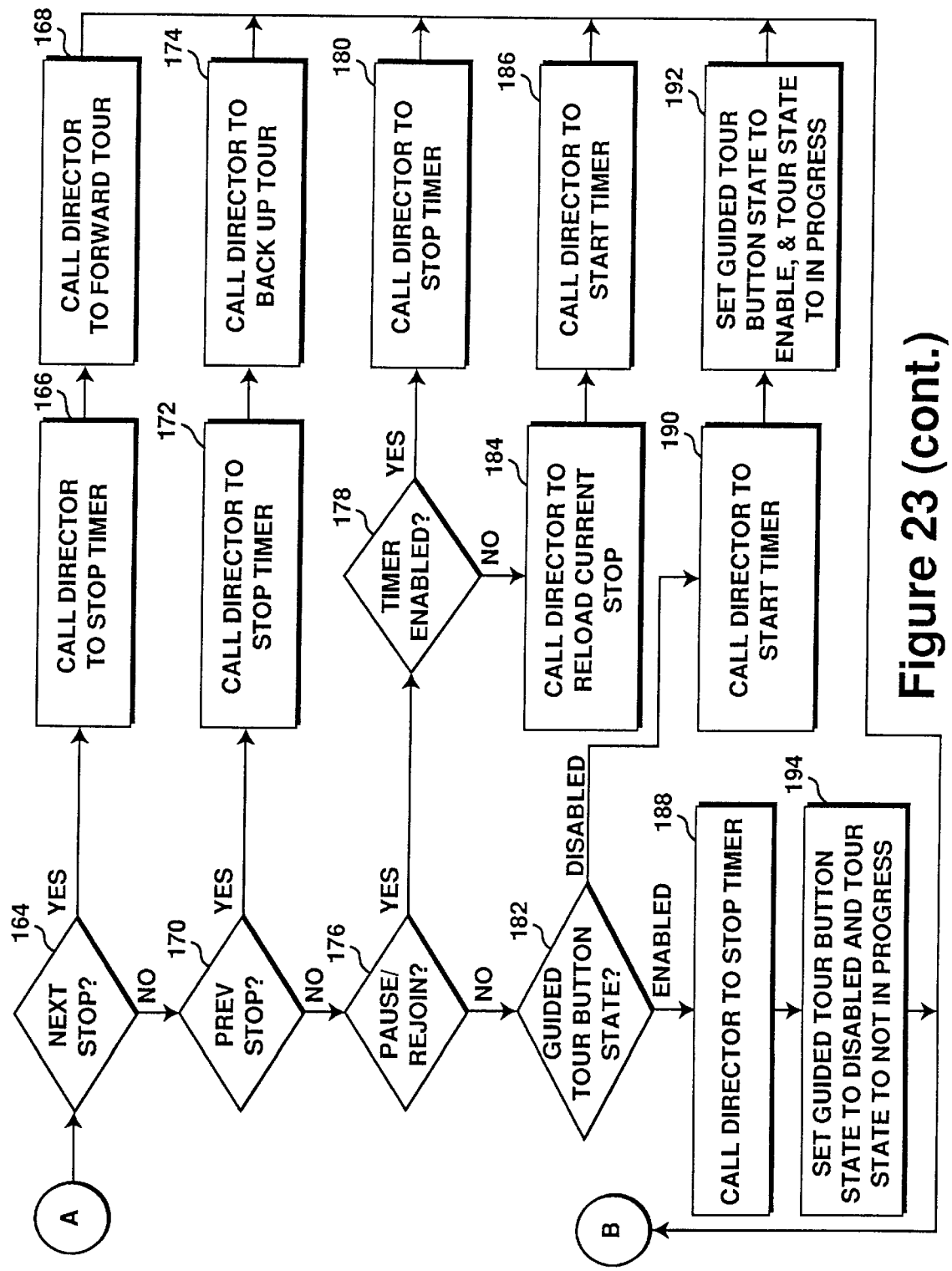

As shown in FIG. 23, upon given control, that is when navigation class 92 is notified of the fact that an user action has been detected, i.e. double click etc., for the illustrated embodiment, the Action() method determines the nature of action, steps 156,164, etc. If the action is a double-click on one of the displayed tour stops in the GUI, the Action() method sets tour stop to the selected tour stop, step 158, calls the Timer() method of director class 96 to stop the timer, step 160, and then calls the ForwardTourToSelStop() method of director class 96 to forward the tour to the selected tour stop, step 162.

On the other hand, if the action is clicking of the "next-stop" control button, the Action() method calls the Timer() method of director class 96 to stop its timer, step 166, and then calls the ForwardTour() method of director class 96 to forward the tour to the next stop, step 168. If the action is clicking of the "prevstop" control button, the Action() method calls the Timer() method of director class 96 to stop its timer, step 172, and then calls the BackUpTour() method of director class 96 to back up the tour to the previous stop, step 174.

If the action is clicking of the "pause" or "rejoin" control button, the Action() method further determines if the timer of director class 96 is enabled, step 178. If the timer of director class 96 is enabled, the Action() method calls the Timer() method of director class 96 to stop its timer, step 180, otherwise the Action() method calls the ReloadCurrentStop() method of director class 96 to rejoin the tour at the current stop, step 184, and calls the Timer() method of director class 96 to start its timer, step 186.

If the action is clicking of the "GuidedTour" control button, the Action() method further determines state of the "GuidedTour" button, i.e. enabled or disabled, step 182. If the state of the button is disabled, the Action() method calls the Timer() method of director class 96 to start timer, step 190, and resets the state of the button and the state of the tour to "in progress", step 192. Otherwise, the Action() method calls the Timer() method of director class 96 to stop timer, step 188, and resets the state of the button and the state of the tour to "not in progress", step 194.

Figure 24:
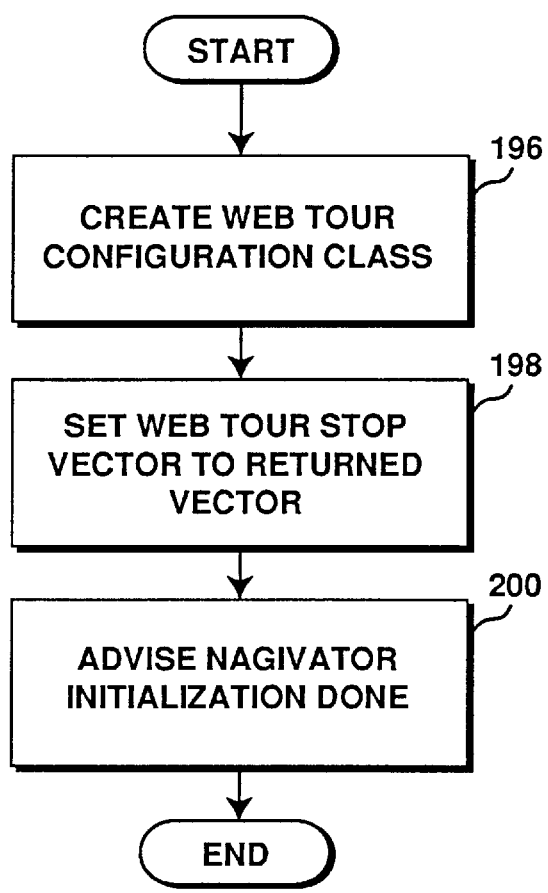
FIGS. 24–29 illustrate one embodiment each of the methods of director class in further details.

FIGS. 24–29 illustrate one embodiment each of the various methods of director class 96 in further details. As shown in FIG. 24, upon given control, that is at initialization time, the Init() method "creates" web tour configuration class 98, resulting in its applets being provided to web touring station 12 from tour operator website 16, step 196. Next, the Init() method sets web tour stop vector 100 to the vector returned as a result of creating configuration class 98, to be described more fully below, step 198. Finally, the Init() method advises navigation class 92 that director class 96 has completed initialization.

Figure 25:
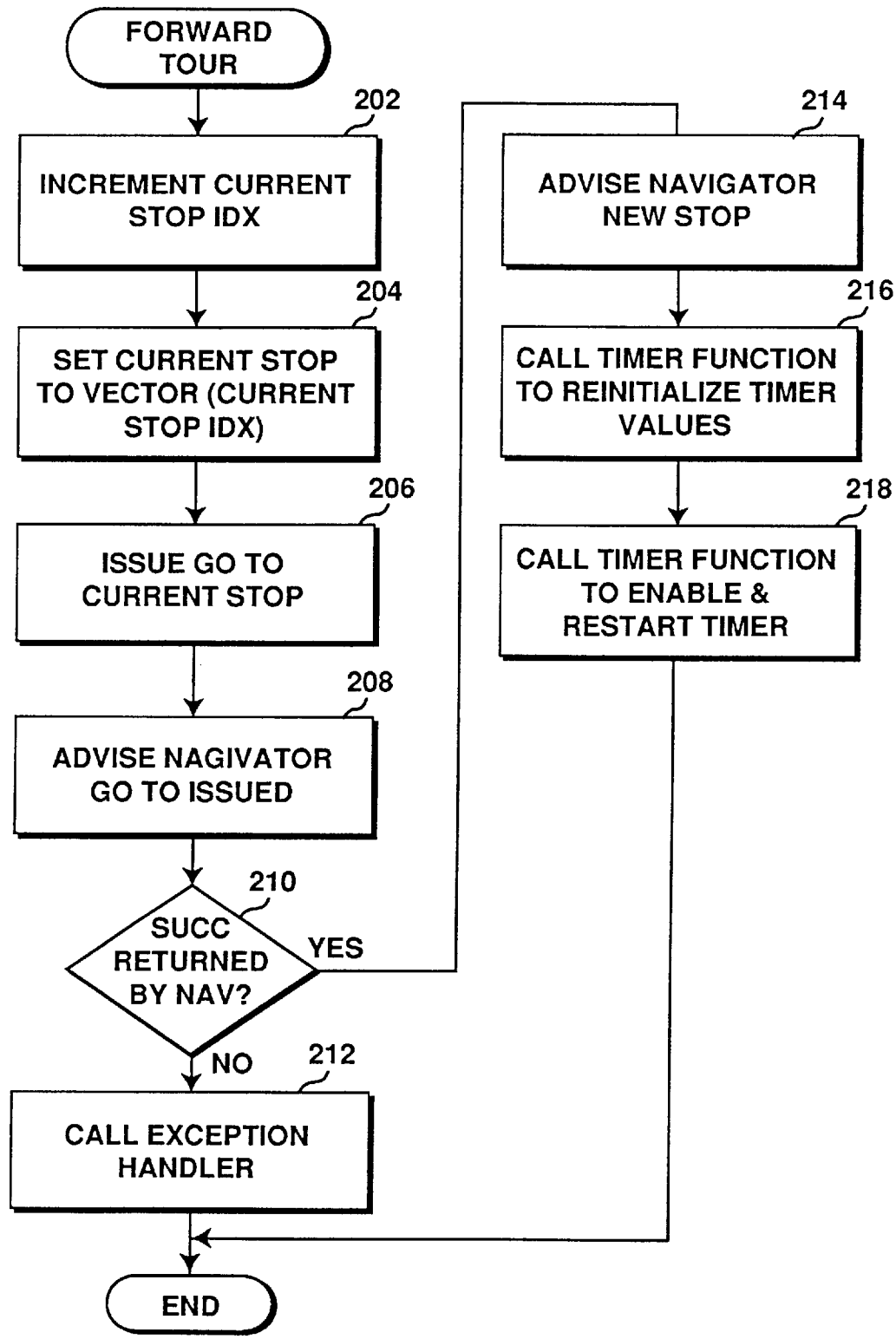

As shown in FIG. 25, upon being given control, that is when invoked, the ForwardTour() method increments a current stop index, step 202, and sets the current stop to the tour stop in tour stop vector 100 indexed by the current stop index, step 204. Next the ForwardTour() method issues a GoTo command to the current stop, step 206. Upon issuing the command, the ForwardTour() method advises navigation class 92 a GoTo has been issued, step 208. As described earlier, the NotifyGoToIssued() method of navigation class 92 will locate the corresponding media complement, render it, and return a success indicator to director class 96. Thus, upon notifying navigation class 92, the ForwardTour() method looks for the return of the success indicator from navigation class 92, step 210. If a failure indicator is returned instead, the ForwardTour() method calls an exception handler to handle the error. The error may be handled in any one of a number of application dependent manner. If a success indicator is returned, the ForwardTour() method advises navigation class 92 again of the fact that the tour is in a new stop, step 214. Furthermore, the ForwardTour() method calls the Timer() method to re-initialize the timer values, enables the timer and restarts the timer, steps 216–218.

Figure 26:
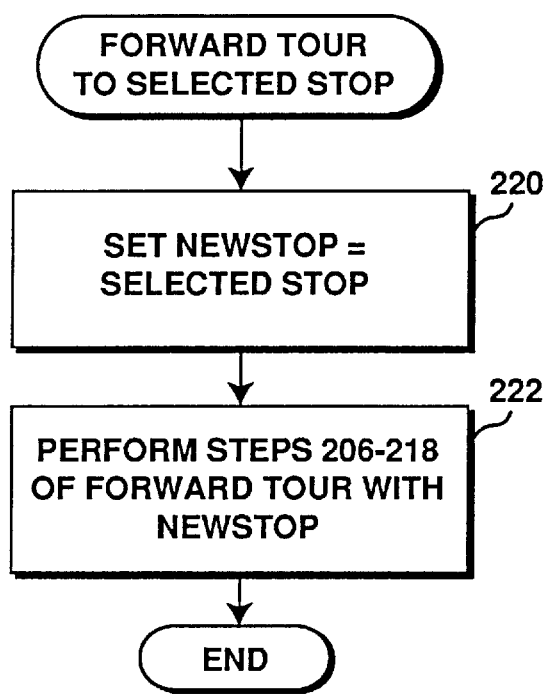
Figure 28:
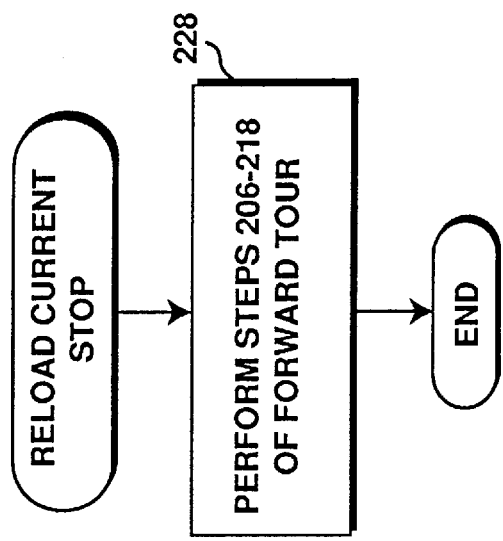
Figure 27:
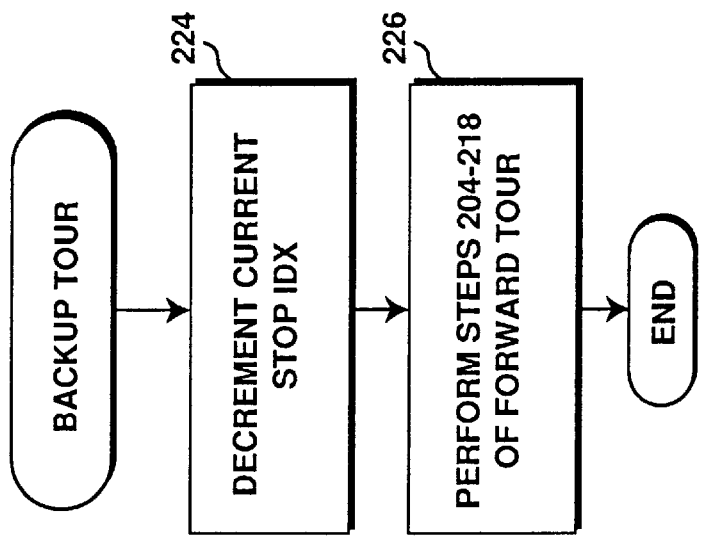

As shown in FIG. 26, upon given control, that is when invoked, the ForwardTourToSelStop() method sets the new stop to the selected stop, step 220, and then performs steps similar to steps 206–218 of the ForwardTour() method with the new stop, step 222. As shown in FIG. 27, upon given control, that is when invoked, the BackUpTour() method decrements the current stop index, step 224, and then performs steps similar to steps 204–218 of the ForwardTour() method, step 226. As shown in FIG. 28, upon given control, that is when invoked, the ReloadCurrentStop() method performs steps similar to steps 206–218 of the ForwardTour() method, step 228.

Figure 29:
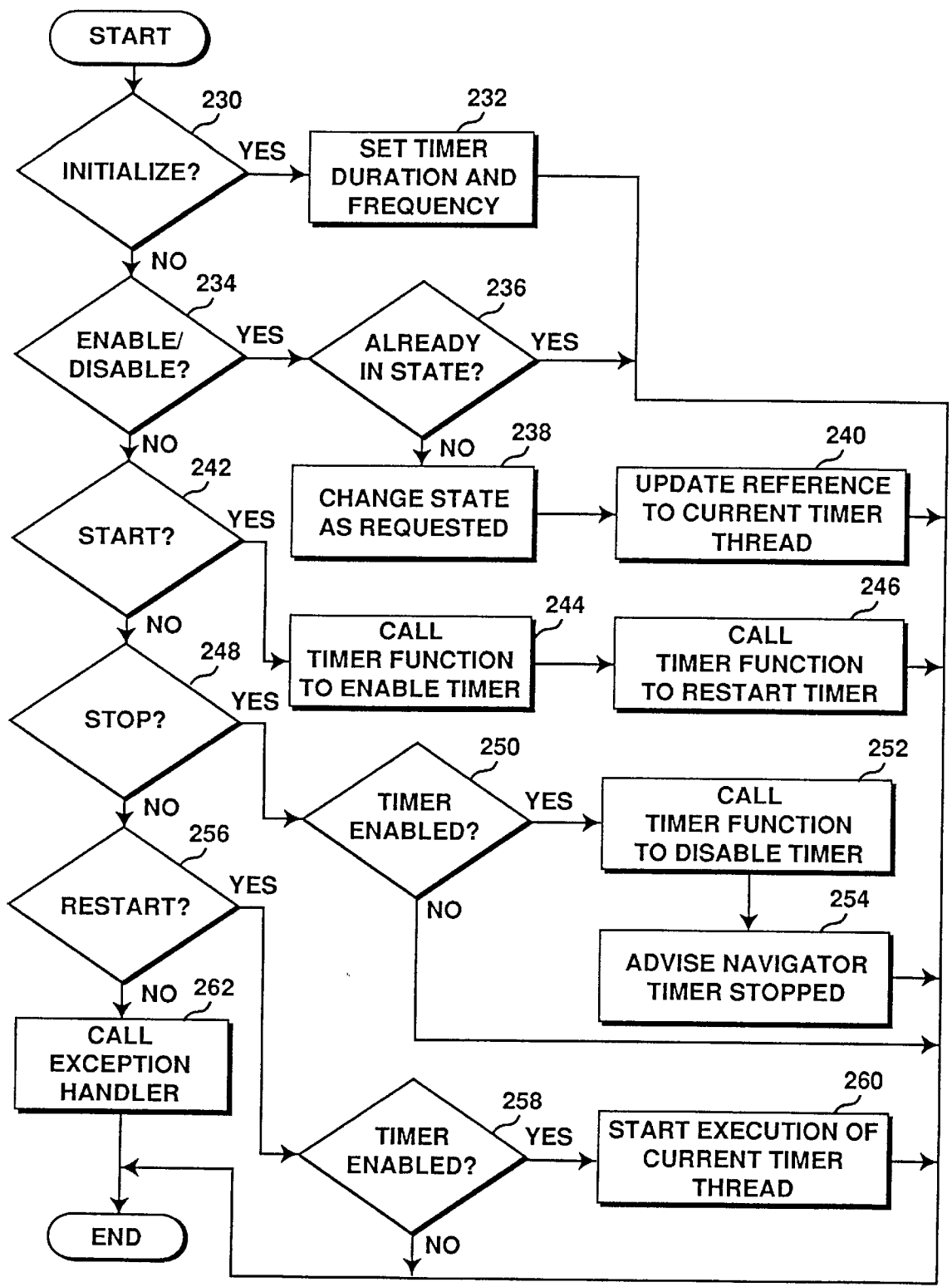

As shown in FIG. 29, upon given control, that is when invoked, the Timer() method determines what is the nature of the invocation, steps 230, 234, etc. If the Timer() method is invoked to initialize the timer, the Timer() method sets the timer duration and frequency parameters accordingly, step 232. If the Timer() method is invoked to enable/disable the timer, the Timer() method further determines if the timer is already in the desired state. If the timer is already in the desired state, the request is ignored, otherwise the Timer() method changes the state as requested, and updates its internal reference to the current timer thread, steps 238–240.

If the Timer() method is invoked to start the timer, the Timer() method calls itself to enable the timer, and then calls itself again to restart the timer, step 244–246. If the Timer() method is invoked to stop the timer, the Timer() method further determines if the timer is enabled, step 250. If the timer is not enabled, the request is ignored, otherwise the Timer() method calls itself to disable the timer, and then calls itself again to stop the timer, step 252–254. If the Timer() method is invoked to restart the timer, the Timer() method further determines if the timer is enabled, step 258. If the timer is not enabled, the request is ignored, otherwise the Timer() method starts execution of the current timer thread, step 260.

Figure 30:
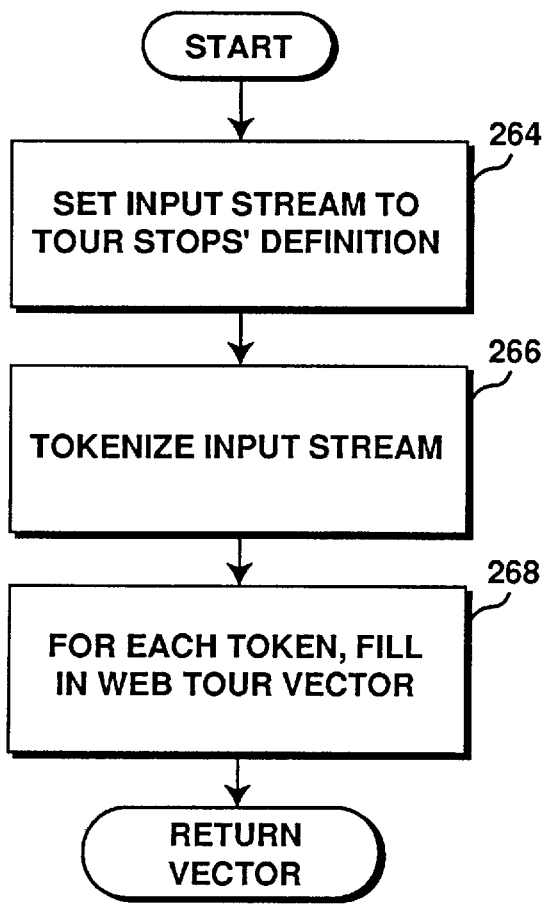
FIG. 30 illustrates one embodiment of the configuration class in further details.

Finally, FIG. 30 illustrates one embodiment of configuration class 98 in further detail. As shown, upon given control, that is at initialization time, configuration class 98 sets an input stream to tour stop definition 76, step 264. Configuration class 98 then tokenizes the input stream, step 266. Then for each token, configuration class 98 generates an object with the appropriate information, and stores them in a working vector, step 268. The process continues until all tokens have been processed. At such time, configuration class 98 returns the working vector to its parent class, i.e. director class 96.

Thus, a method and apparatus for guided touring of websites on the Internet or an intranet have been described. While the methods and apparatus of the present invention have been described in terms of the above illustrated embodiments, those skilled in the art will recognize that the invention is not limited to the embodiments described. The present invention can be practiced with modification and alteration within the spirit and scope of the appended claims.

The description is thus to be regarded as illustrative instead of restrictive on the present invention.

What is claimed is:

1. An apparatus comprising:
   a first execution unit for executing programming instructions; and
   a storage medium coupled to the execution unit, having stored therein
   a) a first plurality of programming instructions to be executed by the first execution unit for transmitting a second plurality of programming instructions for execution by a second execution unit of a second apparatus communicatively coupled to the apparatus, and
   b) the second plurality of programming instructions transmitted in response to the first plurality of programming instructions, the second plurality of programming instructions for execution by the second execution unit for implementing a web tour director function for connecting the second apparatus to one or more web servers in accordance with a web tour stop vector identifying the one or more web servers as web tour stop(s) of a web guided tour, wherein the web tour stop vector includes a plurality of tour stop definitions, each of which includes a duration of a stay at each tour stop.

2. The apparatus as set forth in claim 1, wherein the storage medium further having stored therein
   c) one or more media complements corresponding to the one or more web servers; and
   d) a third plurality of programming instructions for execution by the second execution unit for implementing a media rendering function for rendering the corresponding media complements in concert with the connections to the one or more web servers.

3. The apparatus as set forth in claim 1, wherein the storage medium further having stored therein
   c) a third plurality of programming instructions for execution by the second execution unit for implementing a first navigation function for facilitating dynamic user modifications to the connection(s) to the one or more web servers.

4. The apparatus as set forth in claim 3, wherein
   the first navigation function builds a first graphical end user interface to facilitate dynamic user modifications to the connections to the one or more web servers, and upon building the first graphical end user interface, logically creates the web tour director function, resulting in the second plurality of programming instructions being provided to the second execution unit,
   the third plurality of programming instructions further implements a second navigation function for facilitating dynamic user modifications to the connections to the one or more web servers, the second navigation function builds a second graphical end user interface to facilitate dynamic user modifications to the connections to the one or more web servers, and upon building the second graphical end user interface, subsumes the first navigation function.

5. The apparatus as set forth in claim 4, wherein the first navigation function builds the first graphical end user interface using a number of geometric and iconic primitives packaged and provided from the apparatus to the second execution unit in one file.

6. The apparatus as set forth in claim 4, wherein the first navigation function includes a sub-function for responding to user interactions with either the first or the second graphical end user interface.

7. The apparatus as set forth in claim 3, wherein the first navigation function includes a sub-function for responding to a web touring event notification by the web tour director function.

8. The apparatus as set forth in claim 1, wherein the web tour director function includes a sub-function for forwarding the web guided tour to the next tour stop.

9. The apparatus as set forth in claim 1, wherein the web tour director function includes a sub-function for forwarding the web guided tour to a selected one of the tour stops.

10. The apparatus as set forth in claim 1, wherein the web tour director function includes a sub-function for backing up the web guided tour by one tour stop.

11. The apparatus as set forth in claim 1, wherein the web tour director function includes a sub-function for resuming the web guided tour at the current tour stop.

12. The apparatus as set forth in claim 1, wherein the web tour director function includes a sub-function for performing a timer related task.

13. The apparatus as set forth in claim 1, wherein the storage medium further having stored therein
   c) one or more media complements corresponding to the one or more web servers; and
   d) a third plurality of programming instructions for execution by the second execution unit for implementing a navigation and media rendering function for rendering the corresponding media complements in concert with the connections to the one or more web servers, and for facilitating dynamic user modifications to the connections to the one or more web servers.

14. A machine implemented method for guided touring of websites, the method comprising the steps of:
   a) providing a web touring station with a tour operator website having a web tour viewer responsive to a user of the web touring station selecting a web tour having a number of tour stops, wherein the web tour is defined according to a web tour stop vector that includes a plurality of tour stop definitions, each of which includes a duration of a stay at each tour stop; and
   b) connecting the web touring station to the tour stops with the web tour viewer.

15. The method as set forth in claim 14, wherein the method further comprises the step of c) the web tour viewer rendering a corresponding media complement at each of the tour stop.

16. The method as set forth in claim 14, wherein the method further comprises the step of c) the web tour viewer adjusting said connections responsive the user inputs at the web touring station.

17. A machine implemented method for guided touring of websites, the method comprising the steps of:
   a) providing a web touring station with a tour operator website having a first navigation applet responsive to a user of the web touring station selecting a web tour having a number of tour stops, wherein the web tour is defined according to a web tour stop vector including a plurality of tour stop definitions, each of which includes a duration of a stay at each tour stop;
   b) building a first graphical end user interface with the first navigation applet for facilitating dynamic user modifications to the web tour; and
   c) creating a web tour director applet upon building the first graphical end user interface, resulting in the web tour director applet being provided to the web touring station from the tour operator website.

18. The method as set forth in claim 17, wherein step (a) further comprises the tour operator website providing a second navigation applet to the web touring station; and the method further comprises the steps of (d) the second navigation applet building a second graphical end user interface for facilitating dynamic user modifications to the web tour, and (e) upon building the second graphical end user interface, the second navigation applet subsuming the role of the first navigation applet.

19. The method as set forth in claim 17, wherein the method further comprises the step (d) the web tour director applet logically creating a web tour configuring applet, resulting in the web tour configuring applet and a web tour definition of the web tour being provided to the web touring station from the tour operator website.

20. The method as set forth in claim 19, wherein the method further comprises the step (e) the web tour configuring applet generating a web tour vector identifying a plurality of web tour stops and their properties, including durations of stay at the tour stops, in accordance with the web tour definition.

21. The method as set forth in claim 20, wherein the method further comprises the step (f) the web tour director applet connecting the web touring station to the plurality of web tour stops in accordance with the web tour vector.

22. The method as set forth in claim 21, wherein the method further comprises the step (g) the web tour director applet keeping the navigation applet advised of various touring related events.

23. The method as set forth in claim 22, wherein the method further comprises the step of h) the navigation applet rendering corresponding media complements at the tour stops.

24. The method as set forth in claim 23, wherein the method further comprises the step of i) the navigation applet and the web tour director applet jointly responding to user modifications to the web tour input into the web touring station.

25. An apparatus comprising:

a first execution unit for executing programming instructions; and a storage medium coupled to the execution unit, having stored therein a) a first plurality of programming instructions to be executed by the first execution unit for transmitting a second plurality of programming instructions for execution by a second execution unit of a second apparatus communicatively coupled to the apparatus, b) the second plurality of programming instructions transmitted in response to the first plurality of programming instructions for execution by the second execution unit for implementing a media rendering function for rendering one or more corresponding media complements at the second apparatus when the second apparatus is connected to the first execution unit, wherein the second plurality of programming instructions cause the second execution unit to perform a web tour according to a web tour stop vector including a plurality of tour stop definitions including a duration of a stay at each tour stop; and c) the one or more corresponding media complements, which are retrieved by the second plurality of programming instructions when needed.

26. The apparatus as set forth in claim 25, wherein the storage medium further having stored therein d) a third plurality of programming instructions for execution by the second execution unit for implementing a web tour director function for connecting the other apparatus to one or more web servers, including the first web server, in accordance with a web tour stop vector identifying the one or more web servers as web tour stops of a web guided tour.

27. The apparatus as set forth in claim 26, wherein the storage medium further having stored therein d) a third plurality of programming instructions for execution by the second execution unit for implementing a first navigation function for facilitating dynamic user modifications to the connections to the one or more web servers.

28. The apparatus as set forth in claim 27, wherein the first navigation function builds a first graphical end user interface to facilitate dynamic user modifications to the connections to the one or more web servers, and upon building the first graphical end user interface, logically creates the web tour director function, resulting in the second plurality of programming instructions being provided to the second execution unit, the third plurality of programming instructions further implements a second navigation function for facilitating dynamic user modifications to the connections to one or more web servers, the second navigation function builds a second graphical end user interface to facilitate dynamic user modifications to the connections to the one or more web servers, and upon building the second graphical end user interface, subsumes the first navigation function.

29. A machine implemented method for guided touring of web sites, the method comprising the steps of:

a) providing a web touring station with a tour operator website having a web tour viewer responsive to a user of the web touring station selecting a web tour having one or more tour stops defined according to a web tour stop vector that includes a plurality of tour stop definitions, each of which includes a duration of a stay at each tour stop; and b) rendering one or more corresponding media complements at each of the one or more tour stops with the web tour viewer.

30. The method as set forth in claim 29, wherein the method further comprises the step of c) the web tour viewer connecting the web touring station to the one or more tour stops.

31. The apparatus as set forth in claim 1, wherein the storage medium further having stored therein c) a tour stop definition identifying the one or more web servers as web tour stops of the web guided tour; and d) a third plurality of programming instructions for execution by the second execution unit for generating the web tour stop vector in accordance with the tour stop definition.

* * * * *